(12) United States Patent
Sugitani et al.

(10) Patent No.: US 6,823,245 B2
(45) Date of Patent: Nov. 23, 2004

(54) APPARATUS FOR DETERMINING LINEARITY OF TIRE CHARACTERISTIC

(75) Inventors: Nobuo Sugitani, Wako (JP); Masaaki Kawano, Wako (JP); Osamu Tsurumiya, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/623,040

(22) Filed: Jul. 18, 2003

(65) Prior Publication Data

US 2004/0016294 A1 Jan. 29, 2004

(30) Foreign Application Priority Data

Jul. 19, 2002 (JP) ........................................ 2002-211764

(51) Int. Cl.$^7$ ................................................. G06F 7/00
(52) U.S. Cl. .......................... 701/29; 701/41; 701/63; 701/65; 340/438; 340/439; 340/442
(58) Field of Search ........................... 701/29, 34, 41, 701/63, 65; 340/438, 439, 440, 442

(56) References Cited

U.S. PATENT DOCUMENTS

| 5,408,411 A | * | 4/1995 | Nakamura et al. ............ 701/48 |
| 5,591,906 A | * | 1/1997 | Okawa et al. ............. 73/146.5 |
| 5,742,917 A | * | 4/1998 | Matsuno ...................... 701/69 |

* cited by examiner

Primary Examiner—Gertrude A. Jeanglaude
(74) Attorney, Agent, or Firm—Merchant & Gould P.C.

(57) ABSTRACT

A non-linear region controller 45 calculates a standard yaw rate from an actual steering angle θr of steerable wheels detected by a steering angle sensor 10, a deviation from the standard yaw rate, of a yaw rate γr detected by a yaw rate sensor 23, and a rate of change of the yaw rate deviation. Based upon calculated results, the non-linear region controller 45 determines whether tires of a traveling vehicle are in a non-linear region of tire characteristic, and if determining so, exercises a steering amount reduction control to reduce an actual steering angle θr of the steerable wheels. The determination of linearity of tire characteristic can be made with comparative ease utilizing a commonly available sensor, and the vehicle is controlled using the determination result.

6 Claims, 14 Drawing Sheets

APPARATUS FOR DETERMINING LINEARITY OF TIRE CHARACTERISTIC

BACKGROUND OF THE INVENTION

This invention generally relates to an apparatus and program for determining linearity of tire characteristic, which determines the condition of tires of a traveling vehicle in view of linearity of the tire characteristic, and more particularly to a vehicular driving operation apparatus, and a steering control method for steer-by-wire (SBW) vehicles, in which thus-determined condition of the tire is utilized.

Steering gears of vehicles are available in a wide range of variations, such as front-wheel steering gears, rear-wheel steering gears, steering gears with a steering shaft and steerable wheels linked mechanically, and SBW steering gears. Among these types of steering gears, a yaw-rate feedback active steering system known in the art may be provided in order to stabilize vehicle's behavior. The yaw-rate feedback active steering system is designed to compare an actual (actually measured) yaw rate (as an indicator of actual or measured vehicle behavior) with a standard or normative yaw rate (as an indicator of standard or normative vehicle behavior) whereby the directional control for a vehicle is exercised so as to make the actual yaw rate coincide with the standard yaw rate. The standard yaw rate is calculated from a steering angle of the steering shaft, a steering angle (rack position) of the steerable wheels, or other factors, whereas the actual yaw rate is measured with a yaw rate sensor or other vehicle behavior detecting means. The use of this type of active steering system allows the steering gear to provide a stabilized yaw rate in steering (or aiding a driver in steering) the vehicle, and thus serves to effectively stabilize the vehicle.

Utility of the active steering system as described above holds true of cases where the standard yaw rate is greater than the actual yaw rate. However, an adverse effect would be brought about in cases where the vehicle tends to undergo understeer and where the vehicle is on a snowy road or the like, with the actual yaw rate thereof measuring a small value. To be more specific, without reflecting a slipperiness of the road surface, non-linear model of tire characteristic or the like on the control of the steering gear, the steering gear would disadvantageously attempt to make the actual yaw rate closer to the standard yaw rate and to steer the vehicle more so as to increase the steering angle, thus inducing further understeer.

Determination of the slipperiness of road surfaces requires an expensive sensor (e.g., sensors for which the fifth wheel need be installed). The non-linear model of tire characteristic makes the control process complicate. In view of these disadvantages, another approach may be deemed applicable in which the active steering system is disabled in understeer conditions (i.e., standard yaw rate>actual yaw rate); however, this approach would spoil the advantages of the active steering system in cases where the vehicle usually undergoes understeer, with the result that equipment of the active steering system would become ineffectual.

Therefore, it is one exemplary and general object of the present invention to provide an apparatus and program for determining linearity of tire characteristic, in which the condition of tires of a traveling vehicle can be determined using a commonly available sensor and with comparative ease. Another exemplified and more specific object of the present invention is to provide a vehicular driving operation apparatus and steering control method for SBW vehicles, in which the control for a vehicle is exercised utilizing thus-determined condition of the tires.

SUMMARY OF THE INVENTION

The inventors and their colleagues, who have diligently carried on a research to address the above-described problems, focused on the point that comparison between standard vehicle behavior (as indicated by a standard or normative yaw rate) and actual vehicle behavior (as indicated by an actual yaw rate) can be used to determine whether tires stand in a non-linear region or linear region of tire characteristic, and finally completed the present invention.

[Apparatus for Determining Linearity of Tire Characteristic]

According to one exemplified aspect of the present invention, there is provided an apparatus for determining linearity of tire characteristic comprising: a standard vehicle behavior arithmetic unit that calculates a standard vehicle behavior indicator based upon at least one of an operation amount of an operation unit with which a driver of a traveling vehicle performs a steering operation and an actually steered amount of steerable wheels of the traveling vehicle; and a tire characteristic linearity determination unit that compares an actual vehicle behavior indicator with the standard vehicle behavior indicator, to determine whether tires of the traveling vehicle stand in a linear region or in a non-linear region of the tire characteristic. The operation amount of the operation unit, actually steered amount of the steerable wheels, and actual vehicle behavior indicator may be detected by an operation amount detector, a steered amount detector and a vehicle behavior detector, respectively.

In this arrangement, a standard vehicle behavior indicator is calculated based upon detected values transmitted from at least one of the operation amount detector and the steered amount detector, and the resulting standard vehicle behavior indicator is compared with the actual vehicle behavior indicator detected by the vehicle behavior detector, so that determination is made whether the tires stand in the linear region or in the non-linear region. The vehicle behavior indicator includes, but not limited to, a yaw rate as described in one exemplary embodiment which will be described later; for example, a lateral acceleration may be utilized instead. Sensors required for this arrangement, as denoted above by the operation amount detector and/or the steered amount detector, and the vehicle behavior detector, may be selected among general purpose sensors that are inexpensive and thus readily available. Alternatively, sensors with which most vehicles have already been equipped may be used as all or part of the above detectors.

In the non-linear region of tire characteristic, the vehicle is placed in a condition to become unsteerable or undergo understeer even if the steering angle (steering amount) is increased. In contrast, in the linear region of the tire characteristic, the vehicle is in a condition to be steered in an intended direction as the steering angle is increased.

The above tire characteristic linearity determination unit may include: a vehicle behavior deviation change rate arithmetic part that calculates a vehicle behavior deviation by subtracting the actual vehicle behavior indicator from the standard vehicle behavior indicator, and calculates a rate of change of the vehicle behavior deviation; a sign determination part that determines a first sign of one of the vehicle behavior deviation and the rate of change of the vehicle behavior deviation, and a second sign of the actual vehicle behavior indicator; a tire characteristic linearity determination part that determines linearity of tire characteristic, wherein if the first and second signs are both positive and the rate of change of the vehicle behavior deviation is greater than a first prescribed value, and if the first and second signs are both negative and the rate of change of the vehicle behavior deviation is less than a second prescribed value, it is determined that the tires of the traveling vehicle stand in the non-linear region of the tire characteristic.

If the first sign (positive (+)/negative (−)) of the rate of change of the vehicle behavior deviation and the second sign (positive (+)/negative (−)) of the actual vehicle behavior indicator are both positive (+), it is determined that the tires of the traveling vehicle stand in the non-linear region of the tire characteristic when the rate of change of the vehicle behavior deviation is greater than a first prescribed value. On the contrary, the first and second signs are both negative (−), it is determined that the tires of the traveling vehicle stand in the non-linear region of the tire characteristic when the rate of change of the vehicle behavior deviation is less than a second prescribed value. In other words, if the above conditions are satisfied, it is determined that the actual vehicle behavior indicator is not increased irrespective of the driver's intention to steer the vehicle, or it is determined that the actual vehicle behavior does not sufficiently follow the standard vehicle behavior (the actual vehicle behavior indicator is not increased) even though the steerable wheels are actually steered; therefore, it is determined that the tires stand in the non-linear region of the tire characteristic.

[Program for Determining Linearity of Tire Characteristic]

A program for determining linearity of tire characteristic as another exemplary aspect of the present invention characteristically causes a computer to execute a process as follows to determine whether tires of a traveling vehicle stand in a linear region or in a non-linear region of the tire characteristic. The process includes the steps of: (1) receiving at least one of an operation amount of an operation unit with which a driver of the traveling vehicle performs a steering operation and an actually steered amount of steerable wheels of the traveling vehicle, which are detected by an operation amount detector and a steered amount detector, respectively; (2) calculating a standard vehicle behavior indicator based upon the at least one of the operation amount of the operation unit and the actually steered amount of the steerable wheels; (3) receiving an actual vehicle behavior indicator detected by a vehicle behavior detector; (4) calculating a vehicle behavior deviation by subtracting the actual vehicle behavior indicator from the standard vehicle behavior indicator; (5) calculating a rate of change of the vehicle behavior deviation; (6) determining a first sign of one of the vehicle behavior deviation and the rate of change of the vehicle behavior deviation, and a second sign of the actual vehicle behavior indicator; (7) if the first and second signs are both positive and the rate of change of the vehicle behavior deviation is greater than a first prescribed value, determining that the tires of the traveling vehicle stand in the non-linear region of the tire characteristic; and (8) if the first and second signs are both negative and the rate of change of the vehicle behavior deviation is less than a second prescribed value, determining that the tires of the traveling vehicle stand in the non-linear region of the tire characteristic.

A processor or CPU (Central Processing Unit) in a computer loads a program for determining linearity of tire characteristic stored in a storage device into memory or RAM (Random Access Memory), and executes the process steps as described above to implement functionality of each step on the computer. To be more specific, the program performs calculation of a standard vehicle behavior indicator from detected values received from at least one of the operation amount detector and the steered amount detector, and comparison between the detected values and an actual vehicle behavior indicator detected by the vehicle behavior detector (determination of signs of the detected values), to determine whether the tires of the traveling vehicle stand in the linear region or in the non-linear region of the tire characteristic. The program may be duplicated, and each stored in a medium and placed in physical distribution channels, or transmitted via communications network.

[Vehicular Driving Operation Apparatus]

A vehicular driving operation apparatus as yet another exemplary aspect of the present invention includes: an operation unit with which a driver of a traveling vehicle performs a steering operation; a steering amount detection unit including at least one of an operation amount detector that detects an operation amount of the operation unit and a steered amount detector that detects an actually steered amount of steerable wheels of the traveling vehicle; a steering motor that drives the steerable wheels to be steered; a control unit that controls the steering motor based upon at least one of the operation amount of the operation unit and the actually steered amount of the steerable wheels; a vehicle behavior detector that detects an actual vehicle behavior indicator; the apparatus for determining linearity of tire characteristic as described above; and a steering amount reduction control unit that controls the steering motor so that the steering motor drives the steerable wheels to be steered back if the tire characteristic linearity determination unit determines that the tires of the traveling vehicle stand in the non-linear region of the tire characteristic.

With this vehicular driving operation apparatus, if the tires stand in the non-linear region of the tire characteristic, the steering motor drives the steerable wheels to be steered back. At this stage, the steering motor may be controlled so that the steering amount is reduced, or the steering motor may be controlled so as to prevent the steering operation of the driver from further steering the vehicle (i.e., to prevent the operation amount of the operation unit from being increased) without actually reducing the steering amount. The steering motor may be an assist motor or the like for use with an electric power steering system which assists a driver in performing a manual steering operation.

One variation of the vehicular driving operation apparatus according to the present invention includes: an operation unit with which a driver of a traveling vehicle performs a steering operation; a reaction force motor that gives a reaction force against operation of the operation unit; a steering amount detection unit including at least one of an operation amount detector that detects an operation amount of the operation unit and a steered amount detector that detects an actually steered amount of steerable wheels of the traveling vehicle; a steering motor that drives the steerable wheels to be steered; a control unit that controls the steering motor based upon at least one of the operation amount of the operation unit and the actually steered amount of the steerable wheels; a vehicle behavior detector that detects an actual vehicle behavior indicator; an apparatus for determining linearity of tire characteristic as described above; and a steering amount reduction control unit that controls the reaction force motor so that the reaction force motor drives the operation unit to move back toward a neutral position if the tire characteristic linearity determination unit determines that the tires of the traveling vehicle stand in the non-linear region of the tire characteristic.

With this vehicular driving operation apparatus, if the tires stand in the non-linear region of the tire characteristic, the reaction force motor drives the operation unit to move back toward a neutral position. At this stage, the reaction force motor may be controlled so that the steering amount is reduced, or the reaction force motor may be controlled so as to prevent the steering operation of the driver from further steering the vehicle (i.e., to prevent the operation amount of the operation unit from being increased). When the reaction force motor has already been driving the operation unit to move back toward a neutral position before the condition of the tires comes into the non-linear region, the reaction force motor may be controlled so that the reaction force toward the neutral position becomes large.

[Steering Control Method for a Steer-by-Wire Vehicle]

A steering control method for a steer-by-wire vehicle as yet another exemplary aspect of the present invention has the following features. The steer-by-wire (SBW) vehicle has a steer-by-wire (SBW) system which includes an operation unit with which a driver performs a steering operation, a steering motor that drives steerable wheels to be steered, and a reaction force motor that gives a reaction force against operation of the operation unit, to perform a steering operation through electric connections. The steering control method for such an SBW vehicle includes: (1) calculating a standard vehicle behavior indicator based upon at least one of an operation amount of the operation unit and an actually steered amount of the steerable wheels; (2) comparing an actual vehicle behavior indicator obtained by detection with the standard vehicle behavior indicator, to determine whether tires of the vehicle during traveling stand in a linear region or in a non-linear region of tire characteristic; and (3) if it is determined that the tires of the traveling vehicle stand in the non-linear region of the tire characteristic, controlling at least one of the reaction force motor and the steering motor to steer the steerable wheels toward such a direction as to reduce the steering amount thereof.

With this method, if it is determined that the tires stand in the non-linear region of the tire characteristic, the reaction force motor and/or the steering motor are controlled to steer the steerable wheels toward the direction to reduce the steering amount of the steerable wheels. The direction to reduce the steering amount is that which makes the steering amount of the steerable wheels reduced and in which the steerable wheels are steered back toward a neutral position; however, whether or not the steering amount should be actually reduced to make the steerable wheels back to the neutral position can be specified as deemed appropriate.

Other objects and further features of the present invention will become readily apparent from the following description of preferred embodiments with reference to accompanying drawings.

DETAILED DESCRIPTION OF THE PREFERRED EMBODIMENTS

With reference to the drawings, a description will be given of preferred embodiments of an apparatus for determining linearity of tire characteristic (hereinafter referred to as "linearity determination apparatus" where appropriate), a program for determining linearity of tire characteristic (hereinafter referred to as "linearity determination program" where appropriate), a vehicular driving operation apparatus (hereinafter referred to as "driving operation apparatus" where appropriate), and a steering control method for SBW vehicles, according to the present invention.

[Linear Region/Non-Linear Region of Tire Characteristic]

In the embodiments that will now be described in detail, linearity of tire characteristic is determined by making a comparison between a standard yaw rate (standard vehicle behavior indicator) calculated from an actual steering angle (actually steered amount) and an actual yaw rate (actual vehicle behavior indicator), to resultantly determine whether tires of a traveling vehicle stand in a linear region or in a non-linear region of the tire characteristic. First of all, the principle on which the linearity of tire characteristic is determined will be described. Hereupon, the term "calculate" is used to broadly cover determining a specific value by computation, or other mathematical or arithmetic methods, as well as consultation of a prescribed map.

Figure 1:
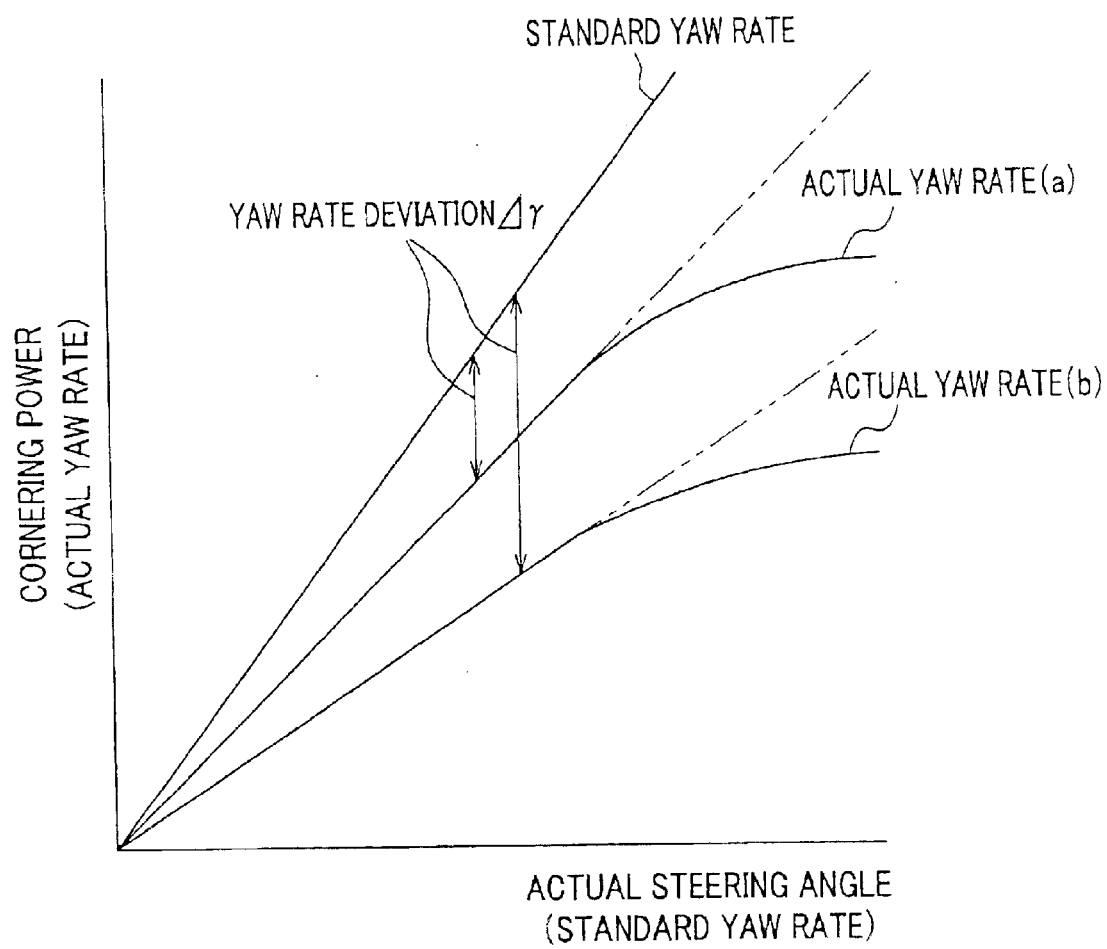
FIG. 1 is a graph for explaining the principle on which linearity of tire characteristic is determined according to the present invention.

FIG. 1 shows relationships between an actual steering angle and cornering power, and between a standard yaw rate (standard vehicle behavior) and an actual yaw rate (actual vehicle behavior). In FIG. 1, the abscissas denote the actual steering angles, and the ordinates denote the cornering power, on the premise that vehicle speed is constant. The actual steering angle, which is a steering angle of actually steered steerable wheels, is calculated for example from a rack position detected by a rack position sensor. The cornering power is equivalent to a grip of tires on a road, or lateral acceleration, which is measured in terms of the earth's gravitational force, in a unit simply called the "g".

As shown in FIG. 1, the cornering power basically increases proportionately with increase of the actual steering angle of the steerable wheels, but in a range of the actual steering angles larger than a certain point, the increase in actual steering angle does not produce directly proportional increase of the cornering power. A range in which the characteristic curve exhibits a directly proportional change is a linear region of tire characteristic, and the other range in which the characteristic curve exhibits a non-proportional change is a non-linear region of the tire characteristic. In the non-linear region, the grip of the tires abates.

This relationship is analogous to the relationship between "standard yaw rate" calculated for example from an actual steering angle based upon detection of the rack position sensor and "actual yaw rate" detected by a yaw rate sensor as a vehicle behavior detector. Accordingly, in FIG. 1, a range (linear range) in which the characteristic curve exhibits a directly proportional change is a linear region of the tire characteristic, and the other range in which the characteristic curve exhibits a non-proportional change is a non-linear region of the tire characteristic.

In FIG. 1, a line for a standard yaw rate represents an ideal relationship (directly proportional relationship) of the standard yaw rate versus the actual yaw rate. A line for an actual yaw rate (a) represents a relationship of the standard yaw rate versus the actual yaw rate of the same tires on the road with a little lower coefficient $\mu$ of friction. A line for an actual yaw rate (b) represents a relationship of the standard yaw rate versus the actual yaw rate of the same tires on the road with still lower coefficient $\mu$ of friction.

A gap between the actual yaw rate and the standard yaw rate is a yaw rate deviation. More specifically, in FIG. 1, the deviation of the line for the actual yaw rate (a) from the line for the standard yaw rate is a yaw rate deviation. Similarly, the deviation of the line for the actual yaw rate (b) from the line for the standard yaw rate is a yaw rate deviation, too. The larger the yaw rate deviation, the greater understeer is likely to occur.

However, in the linear region of tire characteristic, even under understeer conditions, if a driver operates the operation unit to increase the actual steering angle, the vehicle can be steered in the intended direction corresponding to the increased actual steering angle. On the other hand, in the non-linear region of the tire characteristic, under similar understeer conditions, even if the driver operates the operation unit to increase the actual steering angle, the vehicle can never or hardly be steered in the intended direction.

The rate of change of the yaw rate deviation (hereinafter referred to as "change rate" where appropriate) is calculated from momentarily changing vehicle behavior (standard yaw rates and actual yaw rates) in actuality. The change rate is given for example by the following equations (1) and (2):

$$\text{ChangeRate}=(\Delta\gamma 1-\Delta\gamma 0)/\Delta\gamma 0 \qquad (1)$$

$$\text{ChangeRate}=(\Delta\gamma 1-\Delta\gamma 0)/(t1=t0) \qquad (2)$$

where the yaw rate deviation at a prescribed time t0 min. is $\Delta\gamma 0$; the yaw rate deviation at a prescribed time t1 min. which comes thereafter is $\Delta\gamma 1$.

The change rate can alternatively be shown by the following equation (3), in which the ratio of the yaw rates is given, though it should not deemed to be the rate of change in the strict sense of the term:

$$\text{ChangeRate}=\gamma 1/\gamma 0 \qquad (3)$$

From thus-obtained rate of change of the yaw rate deviation, various types of information can be obtained; for example, it can be determined whether the vehicle tends to move in a direction that results in increase of understeer, or in a direction that results in decrease of understeer, and if the vehicle tends to move in the direction to increase understeer, whether the understeer increases linearly or not. Further obtained from the rate of change of the yaw rate deviation is information as to whether the condition of the vehicle is in a linear region of tire characteristic or in a non-linear region of the tire characteristic.

[First Embodiment]

Next, a first embodiment of a driving operation apparatus according to the present invention will be described.

The driving operation apparatus utilizes the results of detection by a yaw rate sensor as a vehicle behavior detector and a steering angle sensor as a steered amount detector to determine the linearity of tire characteristic. Based upon the determination result, if it is determined that the tires stand in the non-linear region of the tire characteristic, the driving operation apparatus exercises a "steering amount reduction control (steering angle reduction control)", i.e., reduces the steering angle as a steering amount to make the steerable wheels back toward a neutral position. It is to be understood that this section for the first embodiment also provides descriptions of an apparatus for determining linearity of tire characteristic, a program for determining linearity of tire characteristic, and a steering control method for steer-by-wire vehicles.

(Driving Operation Apparatus Arrangement)

A constitution of the driving operation apparatus as the first embodiment of the present invention will now be described with reference to FIG. 2.

Figure 2:
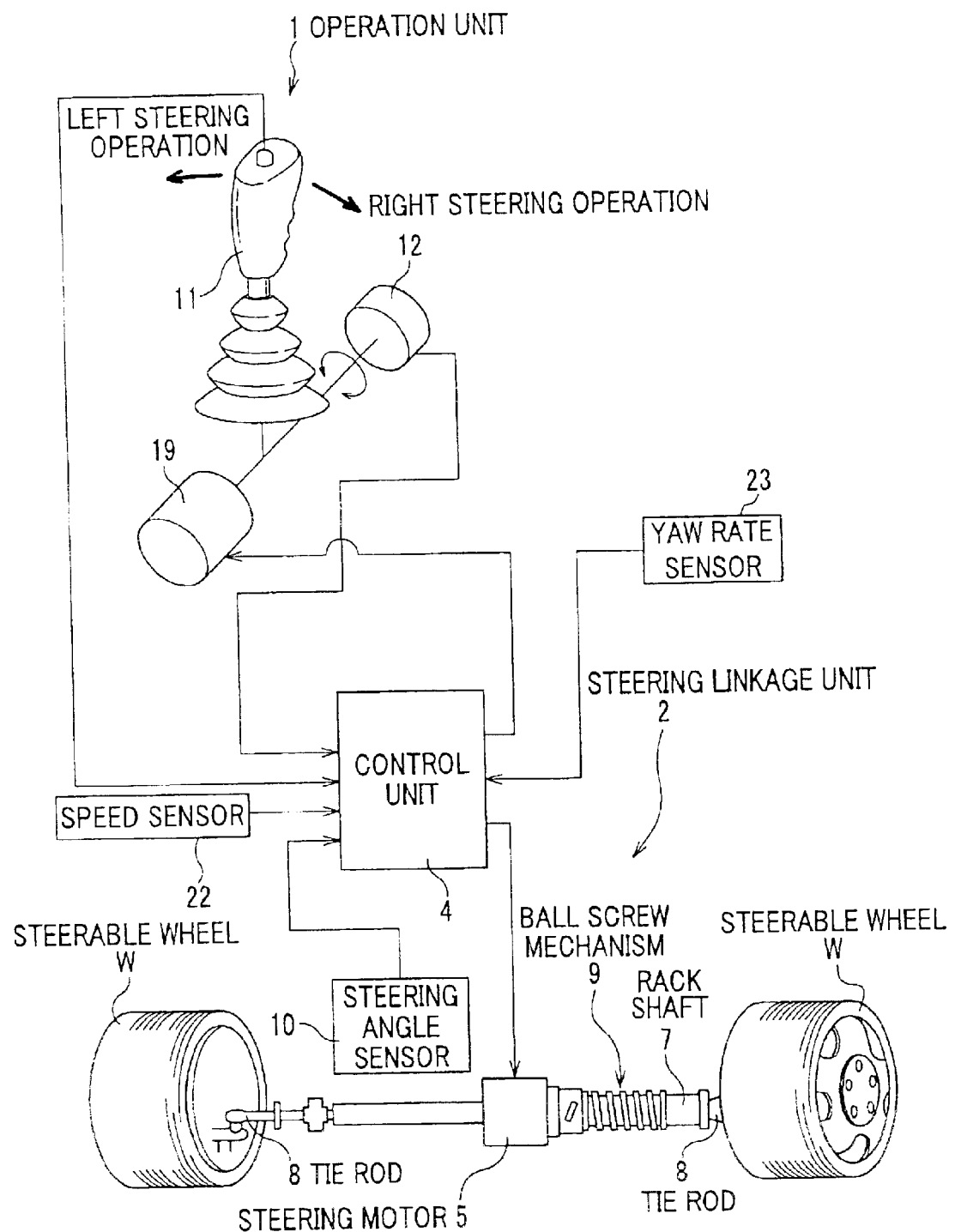
FIG. 2 shows a general structure of a vehicular driving operation apparatus in one exemplified embodiment of the present invention.

As shown in FIG. 2, in the driving operation apparatus, which is a practical embodiment of the steer-by-wire system, an operation unit 1 includes a lever 11, and an operation amount of the lever 11 is manipulated in a control unit 4; according to the manipulation result, a steering motor 5 in a steering linkage unit 2 is driven to steer steerable wheels W, W. Wheels of a vehicle each incorporating this steerable wheel W are each provided with a rubber tire.

The steering operation of the steerable wheels W, W is performed by the steering linkage unit 2 in which a rotational motion of the steering motor 5 is converted to a linear motion of a rack shaft 7 using a ball screw mechanism 9, and the linear motion of the rack shaft 7 is transmitted to the steering operation of the steerable wheels W, W simply through tie rods 8, 8. In other words, the linear motion of the rack shaft 7 is achieved by combination of the steering motor 5 and the ball screw mechanism 9, instead of a conventional rack-and-pinion mechanism. The position of the linearly moving rack shaft 7, which is detected by a steering angle sensor 10, gives feedback utilized by the control unit 4. Hereupon, the steering angle sensor 10 is a rack position sensor that is provided along the rack shaft 7 and senses a rack position to determine an actual steering angle. A linear encoder, potentiometer and other known sensors may be employed singly or in combination. The output of the steering angle sensor 10 is manipulated in the control unit 4 in such a manner that the outputs of an operation torque sensor 15 and an operation angle sensor 16 that will be described later are manipulated.

A detailed description will be given later of an operation amount detector 12 and an operation reaction force motor 19 as illustrated in FIG. 2.

(Operation Unit)

Next, the operation unit 1 will be described with reference to FIG. 3.

Figure 3:
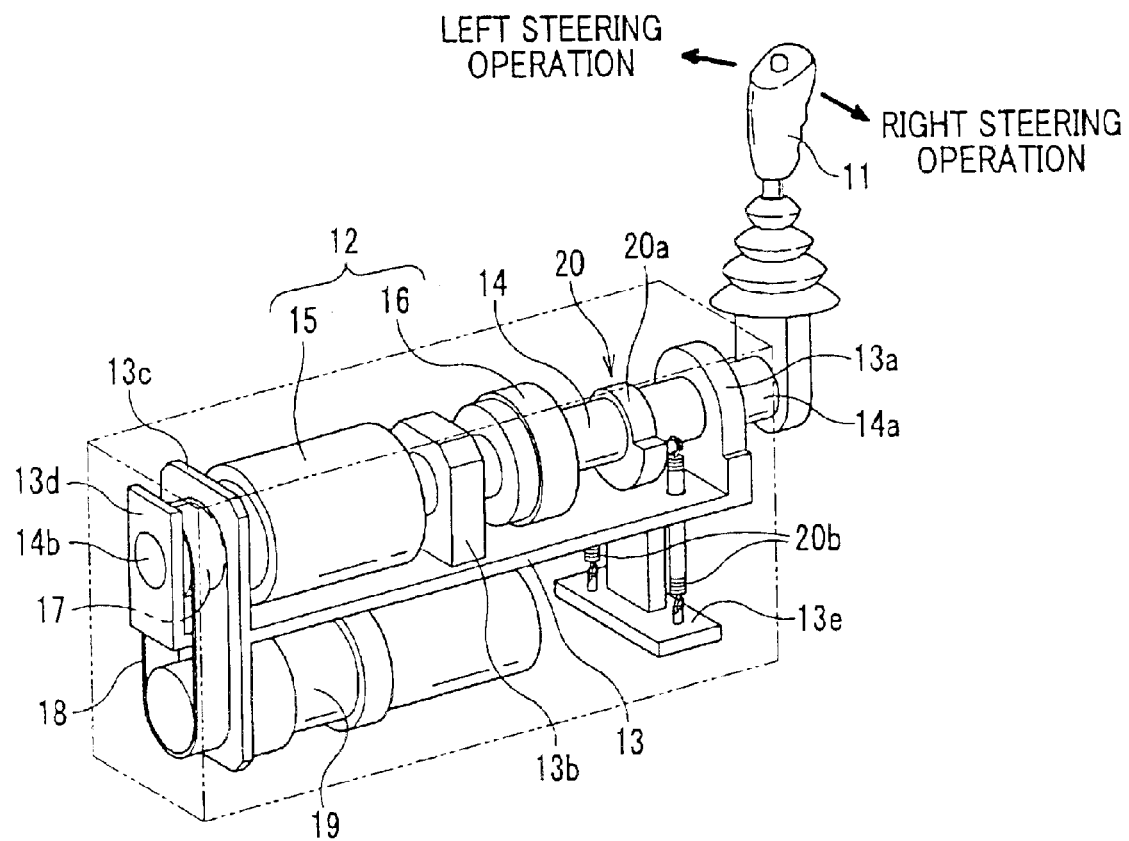
FIG. 3 is a perspective view of one embodiment of an operation unit in the driving operation apparatus as shown in FIG. 2.

As shown in FIG. 3, the operation unit 1 includes a lever 11 which a driver operates, an operation amount detector 12 that detects an operation amount of the lever 11, and a frame 13 that holds the operation amount detector 12.

The lever 11 is an element an upper end of which is gripped and operated by the driver, and at a lower end of which is fixed on one end 14a of a rod 14. The rod 14 is fixed in an orientation perpendicular to the lever 11, and supported on bearings or the like in wall portions 13a, 13b, 13c and 13d of the frame 13. This arrangement allows the lever 11 to pivot about the rod 14 in right and left directions in response to the operation by the driver. Hereinafter, pivoting the lever 11 to the right about the rod 14 to steer the steerable wheels W, W to the right will be referred to as right steering operation, while pivoting the lever 11 to the left about the rod 14 to steer the steerable wheels W, W to the left will be referred to as left steering operation, in the following descriptions.

The operation torque sensor 15 and the operation angle sensor 16, as operation amount detectors 12, are disposed in the longitudinal direction of the rod 14.

Figure 4:
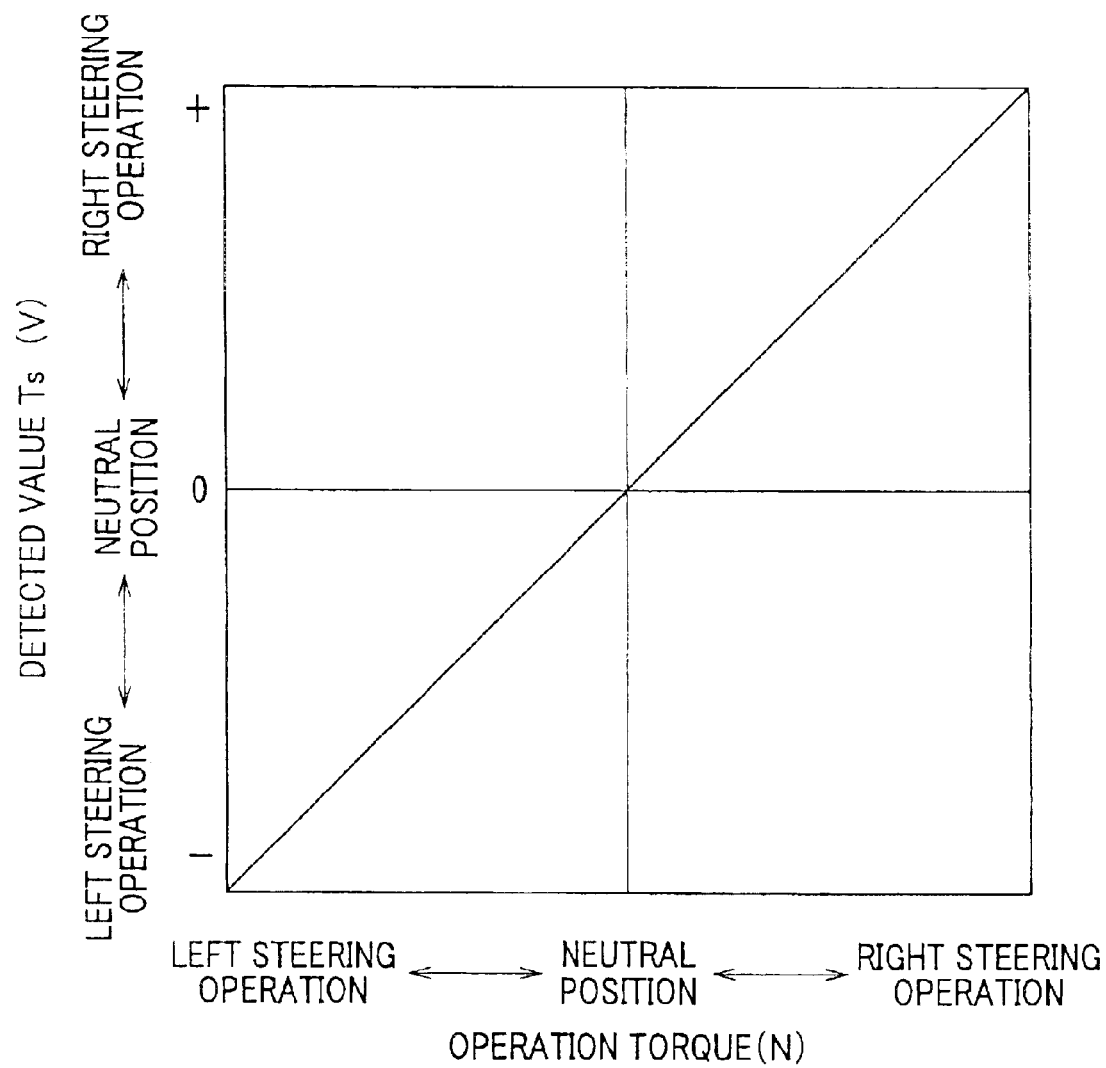
FIG. 4 is a graph for showing output characteristic of an operation torque sensor as shown in FIG. 3.

The operation torque sensor 15 is comprised of a known sensor utilizing a strain gage or the like. The operation torque sensor 15 detects a torque applied to the lever 11 to improve responsiveness upon starting the operation and upon switching (turning) the steering direction of the steerable wheels W, W. The operation torque sensor 15 in the present embodiment outputs analog signals between 0.1–4.9V. The central processing unit or CPU, which constitutes the control unit 4, receives the output signals and manipulates the same as digital data. The output signals are offset by a prescribed value so that the output analog signal at 2.5V corresponds to zero. To be more specific, the control unit 4 handles the output signals (detected values Ts) from the operation torque sensor 15 as signed values (+/−) which are positive (+) when the right steering operation is performed to move the lever 11 from the neutral position thereof to the right, and negative (−) when the left steering operation is performed to move the lever 11 from the neutral position thereof to the left. Accordingly, the output characteristics of the operation torque sensor 15 as recognized by the control unit 4 may be as shown in FIG. 4. The outputs (detected values Ts) from the operation torque sensor 15 are utilized for a feed-forward (FF) control that will be described later.

Figure 5:
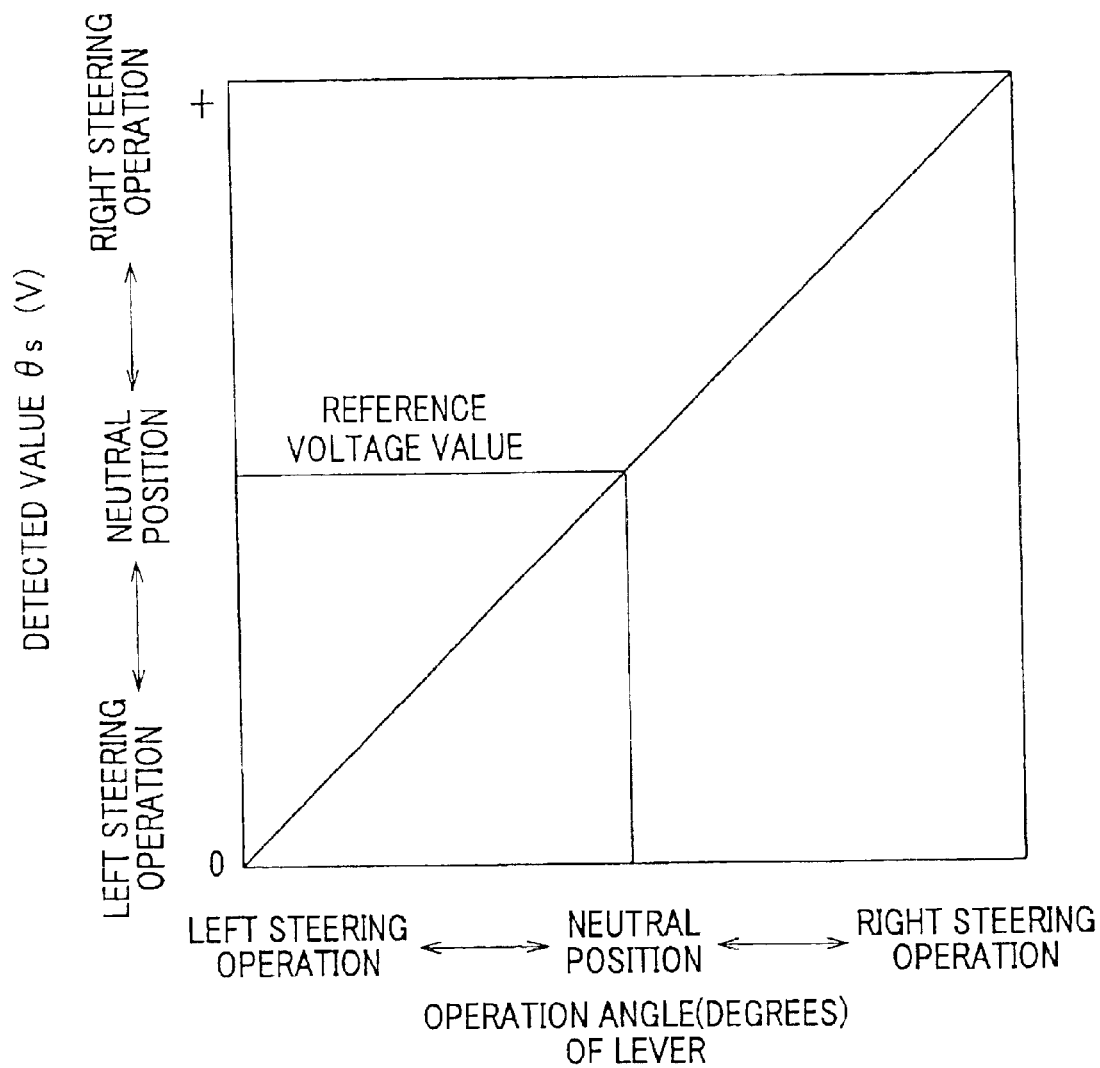
FIG. 5 is a graph for showing output characteristic of an operation angle sensor as shown in FIG. 3.

The operation angle sensor 16 is comprised of a potentiometer that detects an angle of rotation of the rod 14 caused by the operation of the lever 11. The operation angle sensor 16 outputs voltage values (detected values θs) proportionate to the operation angles. The CPU of the control unit 4 manipulates the output signals from the operation angle sensor 16 in the same manner as those from the operation torque sensor 15 as described above. To be more specific, as shown in FIG. 5, a value demonstrated when the lever 11 is located at the neutral position is set at zero as a reference voltage value; when the right steering operation is performed, the detected values θs increase in accordance with the rotation amount of the lever 11, and when the left steering operation is performed, the detected values θs decrease in accordance with the rotation amount of the lever 11. The outputs (detected values θs) from the operation angle sensor 16 are utilized for determination of an actual steering angle of the steerable wheels W, W made by the control unit 4.

An end portion of the rod 14 near the other end 14b opposite to the end 14a on which the lever 11 is fixed has a pulley 17. The pulley 17 is connected through a belt 18 with a rotational shaft of an operation reaction force motor 19.

The operation reaction force motor 19 receives a signal from the control unit 4, and generates a reaction force (operation reaction force) having a prescribed magnitude and a direction opposite to the direction of operation (movement) of the lever 11 in accordance with the position and the direction of operation of the lever 11, in cooperation with a centering mechanism 20, so as to improve the operability and accuracy of the steering operation.

For example, if the lever 11 is pushed down further to the right when the right steering operation is being performed, the centering mechanism 20 generates an operation reaction force opposite to the direction of the right steering operation. At this stage, the greater the operation amount (operation angle) of the lever 11, the greater operation reaction force the centering mechanism 20 generates; therefore, the driver can perceive the steering angle or the amount of his/her own operation at present from the magnitude of the reaction force and the like.

Detailed descriptions will be given later of a signal the control unit 4 transmits to the operation reaction force motor 19 through an operation reaction force motor control signal outputting part 40 and an operation reaction force motor driving circuit 41, and a reaction force the operation reaction force motor 19 gives to the lever 11.

Between the lever 11 and the operation angle sensor 16 are provided the centering mechanism 20 that pushes the lever 11 back toward a neutral position thereof. The centering mechanism 20 includes a plate 20a fixed on the rod 14, and centering springs 20b, 20b which are extended down from right and left end portions of the plate 20a, respectively, to a bottom portion 13e of the frame 13. One end of each centering springs 20b is hooked on the right or left end portion of the plate 20a, while the other end is hooked on the bottom portion 13e. Accordingly, for example, when the left steering operation is performed, one of the centering springs 20b, 20b located at the right side (illustrated as the nearer to a viewer in FIG. 4) is stretched and stressed, generating a reaction force to recover its original length, so as to push the lever 11 back toward the neutral position. When the driver operates the lever 11 back to the neutral position, the reaction force of the above centering spring 20b assists the driver in moving the lever 11 back to the neutral position. The centering mechanism 20 including the centering springs 20b, 20b advantageously serves to let the lever 11 move back toward the neutral position spontaneously.

(Control Unit)

Next, the control unit 4 will be described with reference to FIGS. 1 through 7.

Figure 6:
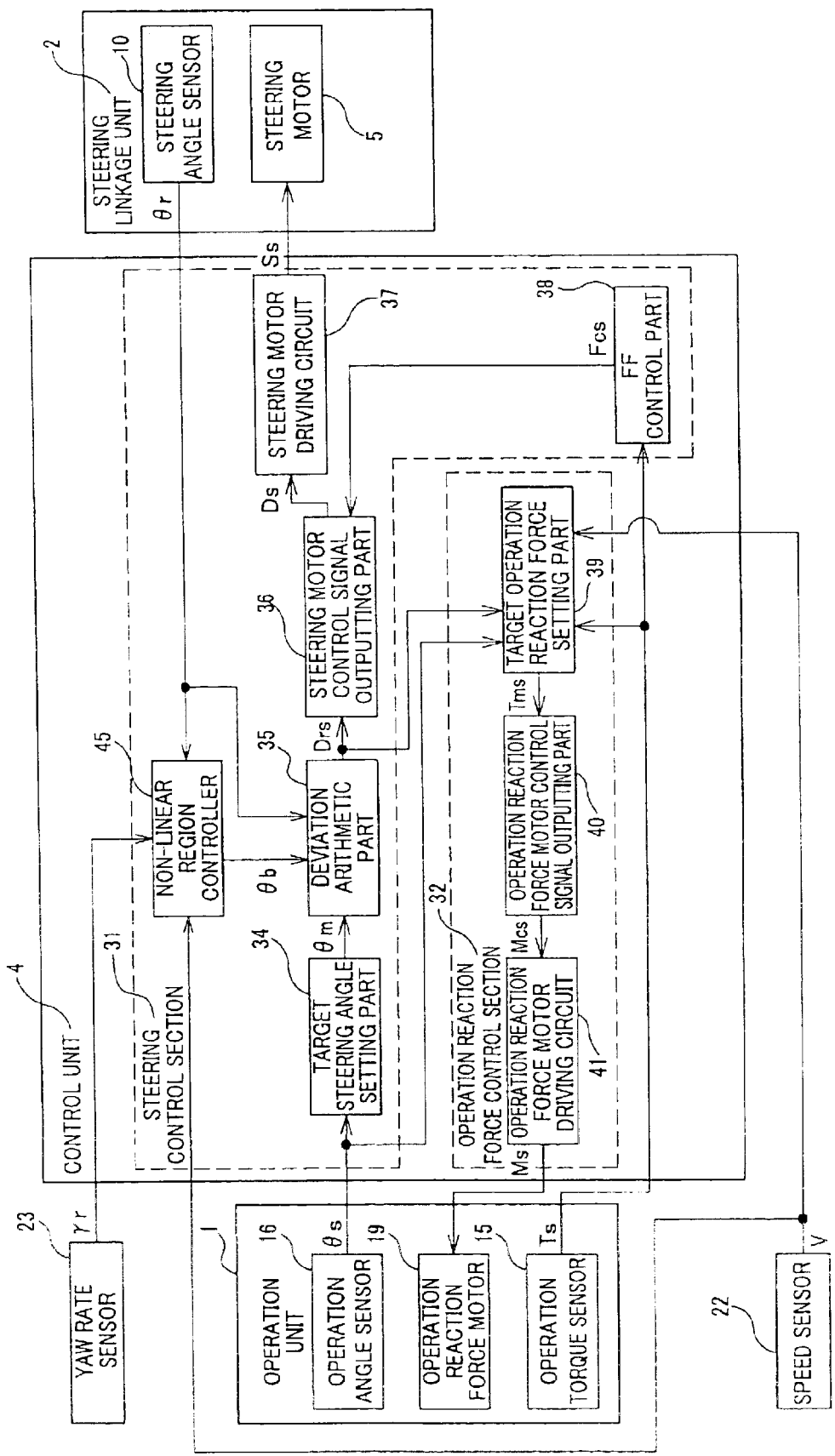
FIG. 6 is a functional block diagram of a control unit in the vehicular driving operation apparatus as shown in FIG. 2.

FIG. 6 is a functional block diagram illustrating internal functional construction of the control unit 4. The control unit 4 includes a CPU (Central Processing Unit), a ROM (Read Only Memory), a RAM (Random Access Memory) and an ECU (Electronic Control Unit) having predetermined electronic circuits. As shown in FIG. 6, the control unit 4 is electrically connected with the operation unit 1 and the steering linkage unit 2 (and steering motor 5 therein) each through a harness as a bundle of signal transmission lines. In the control unit 4, every data (e.g., quantity under control) or information is manipulated by the CPU as a digital signal.

As shown in FIG. 6, the control unit 4 includes a steering control section 31 that controls the steering motor 5, and an operation reaction force control section 32 that controls an operation reaction force motor 19 of the operation unit 1.

(Steering Control Section)

The steering control section 31 includes a target steering angle setting part 34, a deviation arithmetic part 35, a steering motor control signal outputting part 36 and a steering motor driving circuit 37. The target steering angle setting part 34 receives a detected values θs from the operation angle sensor 16 of the operation unit 1, and sets a target value of the actual steering angle (target steering angle signal θm) of the steerable wheels W, W corresponding to the operation of the operation unit 1. The deviation arithmetic part 35 calculates, from the target value of the actual steering angle θm and a currently steered steering angle (actual steering angle signal θr), a deviation amount (deviation amount signal Drs) of these steering angles. The steering motor control signal outputting part 36 generates an output signal Ds (direction signal+PWM signal) for driving the steering motor 5 in accordance with the deviation amount signal Drs. The steering motor driving circuit 37 is an electric circuit for driving the steering motor 5 based upon the output signal Ds.

The target steering angle setting part 34 determines a target steering angle by looking up a map using a detected value θs of the operation angle sensor 16 as an address or search key, and outputs the search result as the target steering angle signal θm. In other words, the driving operation apparatus according to the present embodiment is directed, in principle, to controlling the position of the steerable wheels W, W (i.e., actual steering angle) in accordance with the position of the lever 11 (operation angle).

The deviation arithmetic part 35 subtracts, from the target steering angle signal θm, a steering amount reduction signal θb received from a non-linear region controller 45 that will be described later, to obtain reduced target steering angle. Further, the deviation arithmetic part 35 calculates a deviation amount, from the reduced target steering angle, of the currently steered steering angle θr detected by the steering angle sensor 10. If the resulting deviation amount is positive (+), the steering is to the right, while if the resulting deviation amount is negative (−), the steering is to the left. The deviation amount is outputted to the subsequent process in the form of a deviation amount signal Drs having a directional property (polarity) and magnitude of steering. As will be described later, the steering amount reduction signal θb is zero in a normal condition, i.e., when the tires stand in a linear region of tire characteristic.

The steering motor control signal outputting part 36 performs a PID (proportional, integral and differential) action on the deviation amount signal Drs to obtain a control signal Cs, and combines the control signal Cs with a control signal Fcs of an FF control that will be described later. The steering motor control signal outputting part 36 then outputs an output signal Ds (directional signal+PWM signal) according to the sign and absolute value of the combined value to the steering motor driving circuit 37. The steering motor control signal outputting part 36 has such PID capability as mentioned above, thus improving correspondency of movement of the rack shaft 7 to the target steering angle.

In order to improve an early-stage responsivity of the steering operation, the steering control section 31 also includes an FF control part that exercises FF control by outputting the control signal Fcs to the steering motor control signal outputting part 36 in accordance with a torque value Ts detected by the operation torque sensor 15 of the operation unit 1. With the FF control part, even under conditions, such as during early stages of operation, where the operation amount of the lever 11 is small but the torque applied to the lever 11 is large, the rack shaft 7 can be moved before the operation amount of the lever 11 increases; thereby, the responsivity of the steering operation can be improved. Hereupon, the control signal Fcs is determined based on a map stored in the FF control part 38, which indicates a relationship of detected torque values Ts versus driving amounts of the steering motor 5. The control signal Fcs may be determined by multiplying the detected torque value Ts by a gain without utilizing a map as above.

(Non-Linear Region Controller)

In order to prevent the vehicle condition from further undergoing increased understeer in a non-linear region of tire characteristic, the steering control section 31 further includes a non-linear region controller 45 that serves to move the steerable wheels W, W back toward a neutral position, independently of the driver's intention.

Figure 7:
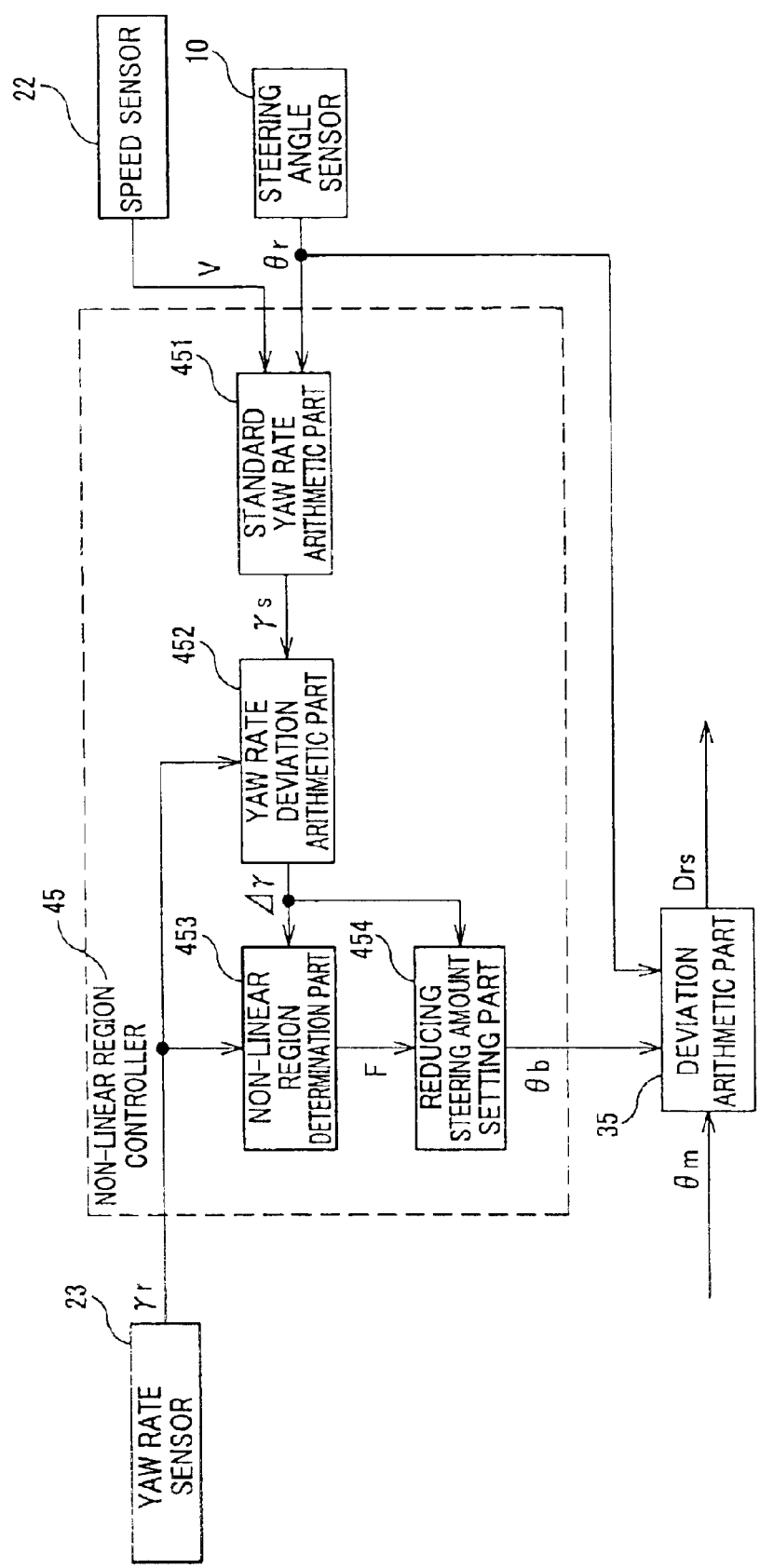
FIG. 7 is a functional block diagram of a non-linear region controller as shown in FIG. 6.

FIG. 7 is a functional block diagram illustrating internal functional construction of the non-linear region controller 45. As shown in FIG. 7, the non-linear region controller 45 includes a standard yaw rate arithmetic part 451, a yaw rate deviation arithmetic part 452, a non-linear region determination part 453, and a reducing steering amount setting part 454. The non-linear region controller 45 serves as an "apparatus for determining linearity of tire characteristic", "tire characteristic linearity determination unit", "steering amount reduction control unit", "sign determination part", and "tire characteristic linearity determination part" according to the present invention.

The standard yaw rate arithmetic part 451 receives an actual steering angle signal θr detected by the steering angle sensor 10 and a vehicle speed signal V detected by the speed sensor 22, performs a predetermined arithmetic operation to calculate a standard yaw rate, and outputs the standard yaw rate in the form of a standard yaw rate signal γs to the subsequent process. This standard yaw rate signal γs reflects the driver's steering intention. The standard yaw rate signal γs may be calculated from the target steering angle signal θm, instead of the actual steering angle signal θr. Moreover, the standard yaw rate signal γs may be located from a map.

The yaw rate deviation arithmetic part 452 receives the standard yaw rate signal γs from the standard yaw rate arithmetic part 451 and an actual yaw rate signal γr from the yaw rate sensor 23. Thereafter, the yaw rate deviation arithmetic part 452 subtracts the actual yaw rate signal γr from the standard yaw rate signal γs to obtain a yaw rate deviation, and outputs the yaw rate deviation in the form of a yaw rate deviation signal Δγ (see FIG. 1). In this instance, both of the standard yaw rate and the actual yaw rate have a positive sign (+) if a direction thereof is to the right and a negative sign (−) if the direction thereof is to the left.

The non-linear region determination part 453 receives the actual yaw rate signal γr and the yaw rate deviation signal Δγ. The non-linear region determination part 453 subtracts a previous value from a current value of the yaw rate deviation signal Δγ at predetermined time intervals (e.g., every several tens of milliseconds), and the resultant value is divided by a predetermined time interval to obtain a rate of change of a yaw rate deviation.

The non-linear region determination part 453 compares (determines) signs of a rate of change of the yaw rate deviation and the actual yaw rate signal γr. As a result, if the signs are both positive (Δγ change rate>0 and γr>0), the non-linear region determination part 453 determines whether the rate of change of the yaw rate deviation is greater than a first prescribed value (the first prescribed value>0). If it is determined that the rate of change of the yaw rate deviation is greater than the first prescribed value, then it is determined (condition 1) that the tires stand in the non-linear region of the tire characteristic, and the non-linear region determination part 453 outputs a flag F=1 so as to instruct the reducing steering amount setting part 454 located downstream thereof to set a steering amount reduction signal θb. Similarly, if the signs are both negative (Δγ change rate<0 and γr<0), the non-linear region determination part 453 determines whether the rate of change of the yaw rate deviation is less than a second prescribed value (the second prescribed value<0). If it is determined that the rate of change of the yaw rate deviation is less than the second prescribed value, then it is determined (condition 2) that the tires stand in the non-linear region of the tire characteristic, and the non-linear region determination part 453 outputs a flag F=1 so as to instruct the reducing steering amount setting part 454 located downstream to set a steering amount reduction signal θb. Hereupon, the flag=1 indicates instruction to set a steering amount reduction signal θb, and the flag=0 indicates instruction to clear the steering amount reduction signal θb. Under normal conditions, where the above condition 1 or 2 is not satisfied, the flag F=0 is outputted. The first and second prescribed values have the same absolute value. The first and second prescribed values serve to indicate thresholds or a dead band.

The reducing steering amount setting part 454 receives the yaw rate deviation signal Δγ from the yaw rate deviation arithmetic part 452 and the flag F from the non-linear region determination part 453. If the flag F=1, the yaw rate deviation signal Δγ is multiplied by a predetermined gain to set a reducing steering amount (reducing steering angle), and the reducing steering amount is outputted in the form of a steering amount reduction signal θb to a deviation arithmetic part 35 located downstream thereof. On the other hand, if the flag F=0, the steering amount reduction signal is not outputted or that which indicates zero is outputted.

Therefore, if the tires stand in the non-linear region of tire characteristic, the steering motor 5 is driven so as to move the steerable wheel W, W back toward the neutral position (in a direction that reduces the actual steering angle toward zero). When the steerable wheels W, W are moved back toward the neutral position, the standard yaw rate γr becomes small and thus the yaw rate deviation Δγ also becomes small, so that the understeer condition would be removed.

(Operation Reaction Force Control Section)

Next, the operation reaction force control section 32 will be described with reference to FIG. 6 as well as FIGS. 8–11, which show a variety of maps.

The operation reaction force control section 32 includes a target operation reaction force setting part 39, an operation reaction force motor control signal outputting part 40 and an operation reaction force motor driving circuit 41. The target operation reaction force setting part 39 determines a target operation reaction force that is exerted on the lever 11 according to a detected vehicle speed value (hereinafter referred to as "vehicle speed" in abbreviation) V from the speed sensor 22 and a detected torque value Ts from the operation torque sensor 15. The operation reaction force motor control signal outputting part 40 receives a target operation reaction force signal Tm outputted from the target operation reaction force setting part 39, and outputs a control signal Mcs for driving the operation reaction force motor 19. The operation reaction force motor driving circuit 41 is an electric circuit for driving the operation reaction force motor 19 in accordance with the control signal Mcs.

Figure 8:
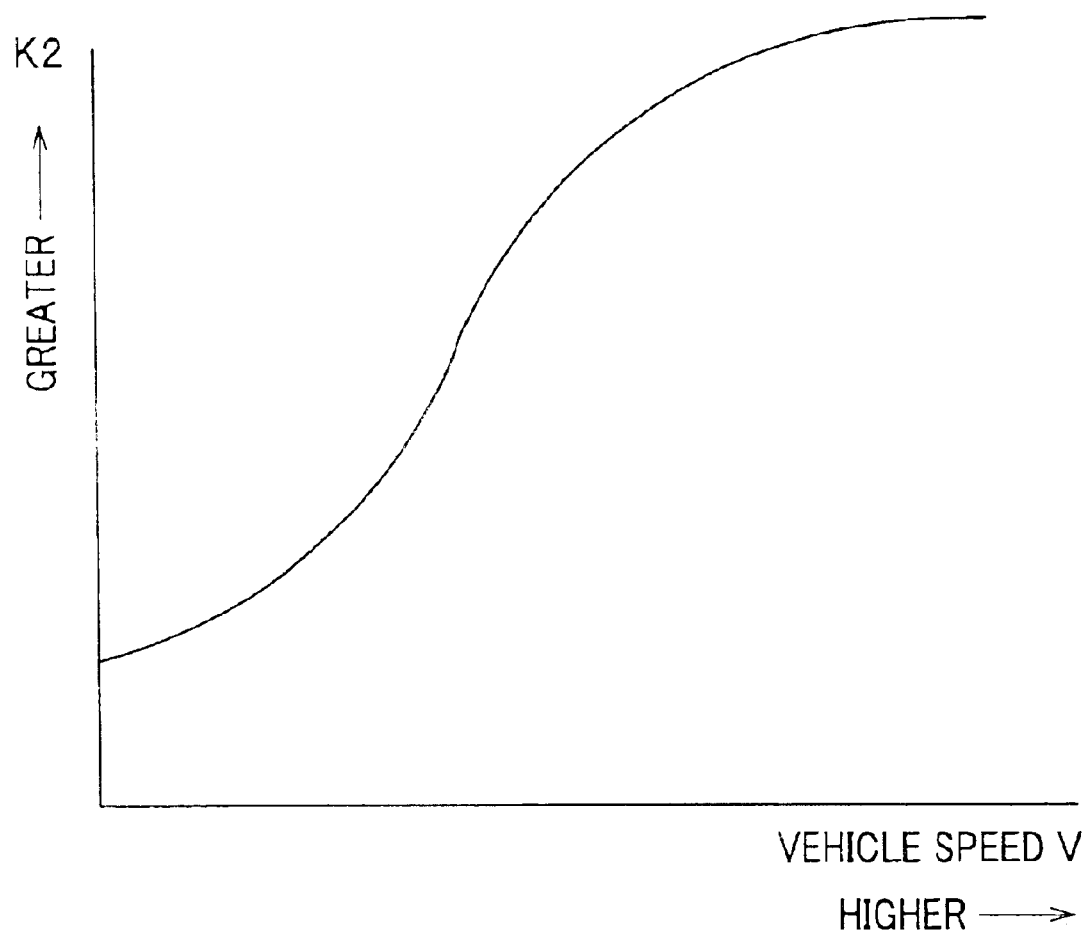
FIG. 8 is a graph for showing a map of coefficients K2 by which a reaction force of a virtual torsion bar is multiplied in the control unit as shown in FIG. 6.

In the operation reaction force control section 32, the target operation reaction force setting part 39 according to the present embodiment is configured to set an operation reaction force derived from a virtual torsion bar control. For that purpose, the target operation reaction force setting part 39 receives a deviation amount signal Drs from the deviation arithmetic part 35. In addition, the target operation reaction force setting part 39 is configured to set an operation reaction force according to a vehicle speed to stabilize the operation of the operation unit 1. For that purpose, the target operation reaction force setting part 39 receives a vehicle speed V from the speed sensor 22, and uses a map as shown in FIG. 8 to locate a coefficient K2 by which the reaction force of the virtual torsion bar control is multiplied (the coefficient K1 is a reaction force of the centering spring 20b, though a further description will not be given herein). The virtual torsion bar control is a control that generates a reaction force as if the steer-by-wire vehicle were provided with a torsion bar (steering shaft).

Figure 9:
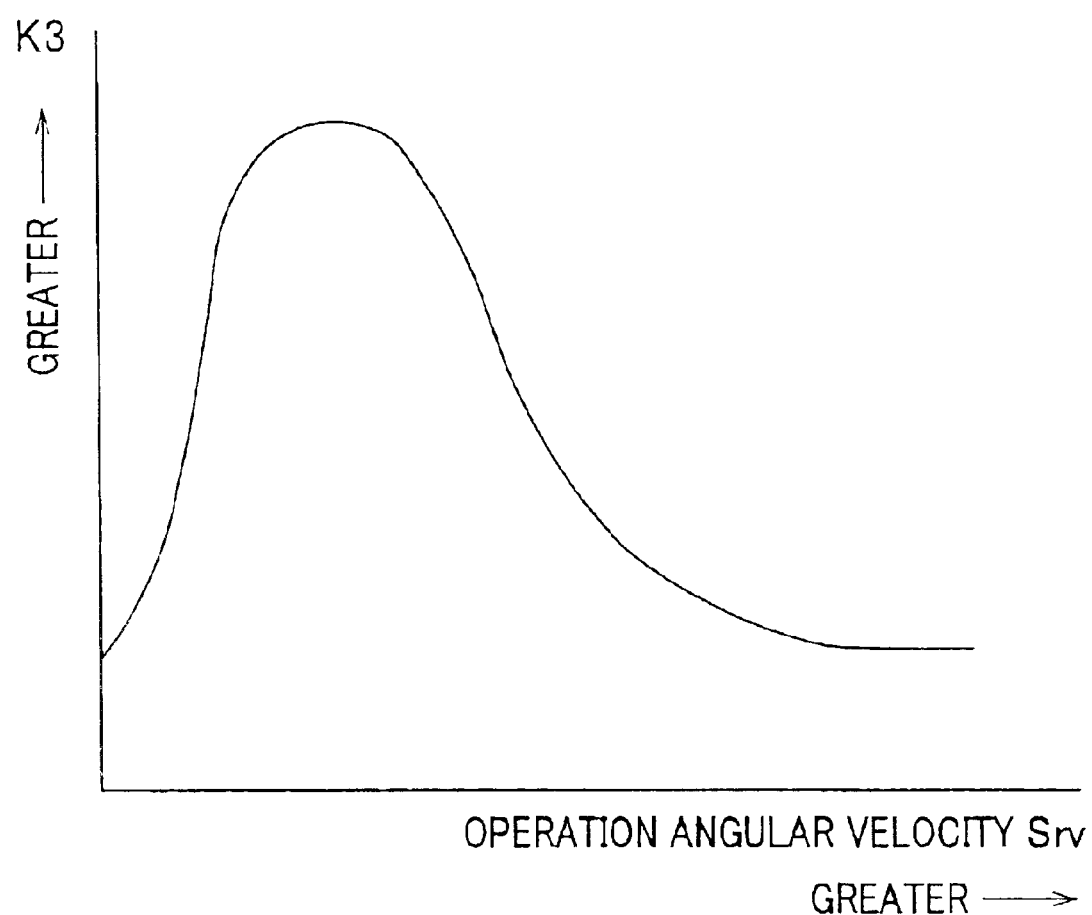
FIG. 9 is a graph for showing a map of coefficients K3 by which a reaction force of a virtual torsion bar is multiplied in the control unit as shown in FIG. 6.
Figure 10:
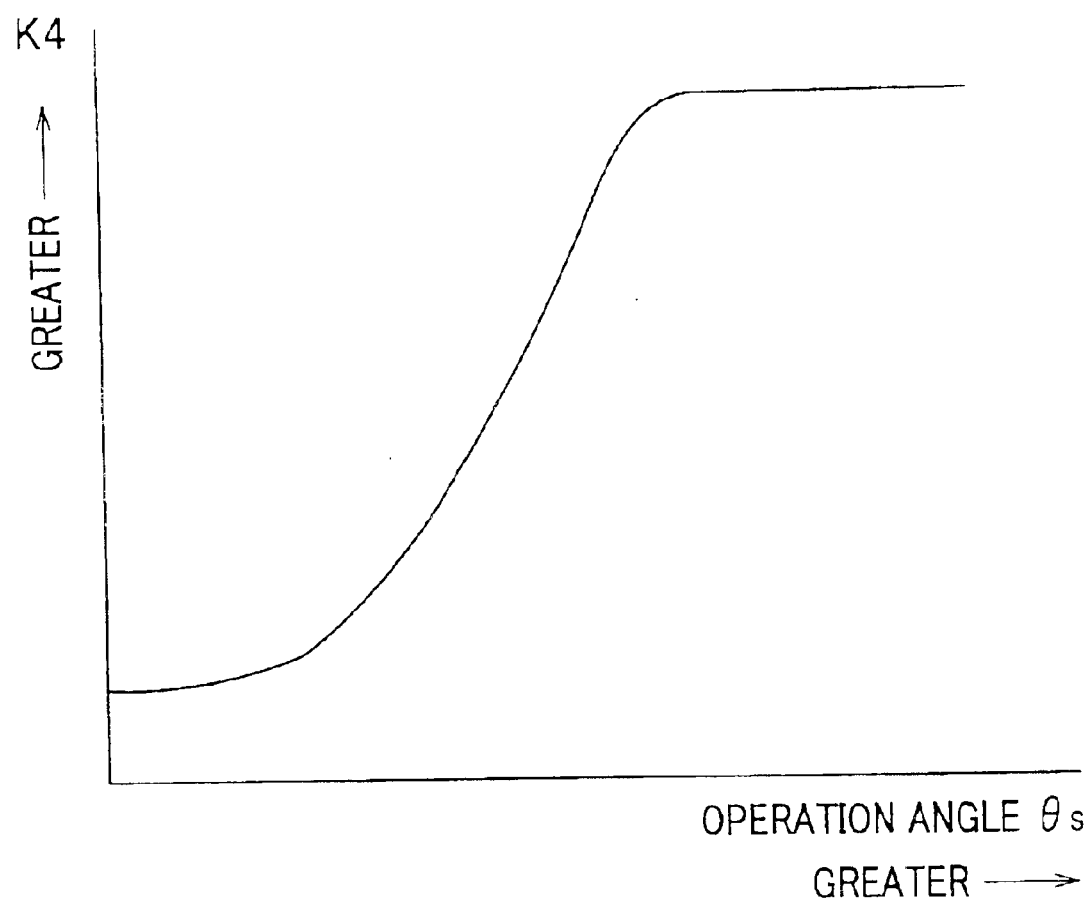
FIG. 10 is a graph for showing a map of coefficients K4 by which a reaction force of a virtual torsion bar is multiplied in the control unit as shown in FIG. 6.
Figure 11:
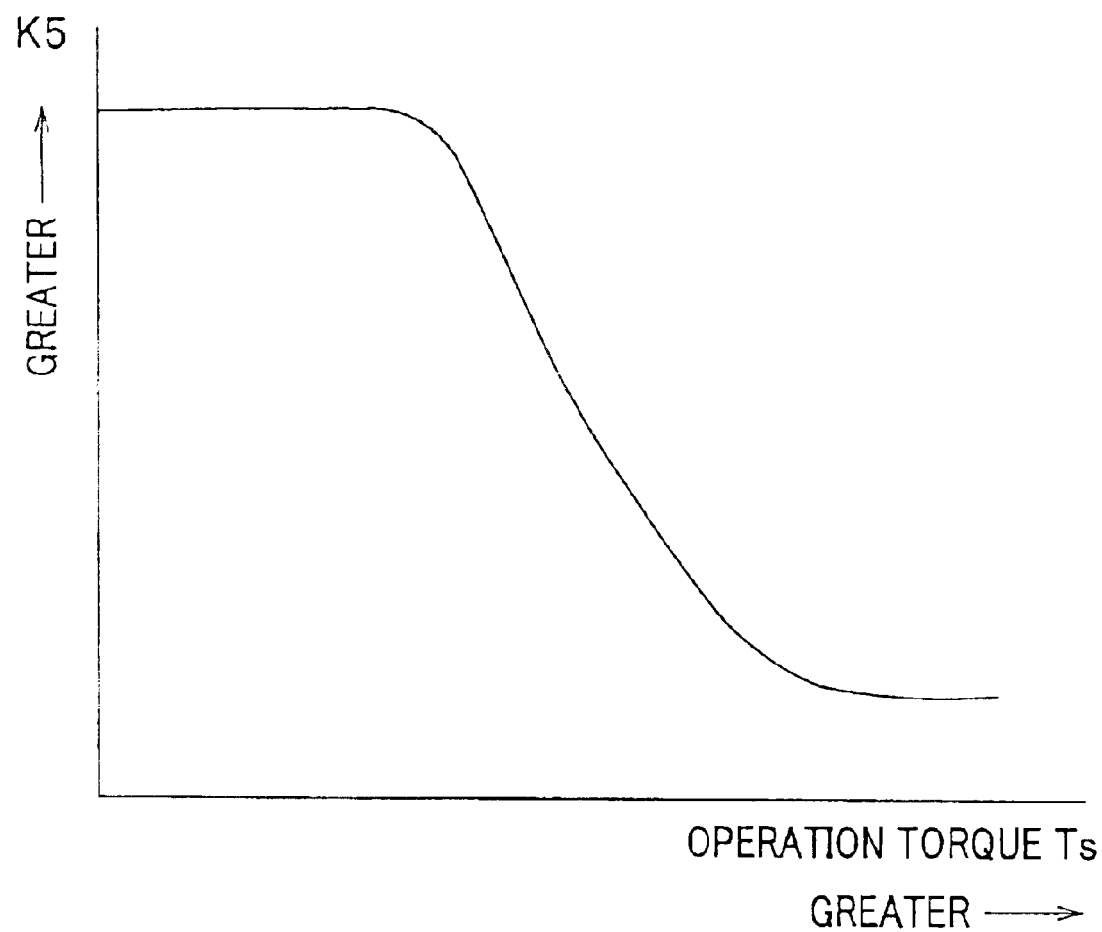
FIG. 11 is a graph for showing a map of coefficients K5 by which a reaction force of a virtual torsion bar is multiplied in the control unit as shown in FIG. 6.

Moreover, the target operation reaction force setting part 39 is configured to make the operation reaction force smaller when the driver operates the lever 11 quickly, so that the driver can operate the lever 11 smoothly. Accordingly, the target operation reaction force setting part 39 receives a detected operation angle value θs from the operation angle sensor 16, and calculates an operation angle speed Srv by differentiation. Subsequently, the target operation reaction force setting part 39 uses a map as shown in FIG. 9 to locate a coefficient K3 by which the reaction force of the virtual torsion bar control is multiplied. Further, the target operation reaction force setting part 39 is configured to make the reaction force smaller when the lever 11 comes near the neutral position, so that the driver can operate the lever 11 smoothly without feeling inconvenience of operation upon quick turn. For that purpose, the target operation reaction force setting part 39 receives a detected operation angle value θs from the operation angle sensor 16, and uses a map as shown in FIG. 10 to locate a coefficient K4 by which the reaction force of the virtual torsion bar control is multiplied. Furthermore, the target operation reaction force setting part 39 is configured to make the operation reaction force smaller when the driver operates the lever 11 with greater force, so that the driver can operate the lever 11 in accordance with his/her wish. Accordingly, the target operation reaction force setting part 39 receives a detected value Ts from the operation torque sensor 15, and uses a map as shown in FIG. 11 to locate a coefficient K5 by which the reaction force of the virtual torsion bar control is multiplied.

Consequently, the target operation reaction force 39 determines a target operation reaction force by multiplying the deviation signal Drs by all the coefficients K2 through K5, and outputs the target operation reaction force in the form of a target operation reaction signal Tms. Alternatively, the target operation reaction force 39 determines a first reaction force amount by multiplying the operation reaction force of the virtual torsion bar control by the coefficient K2, and a second reaction force amount by multiplying the coefficients K3 through K5 at the same time, and adds the first and second reaction force amounts to determine a target operation reaction force and outputs the same in the form of a target operation reaction force signal Tms. The operation reaction force motor control signal outputting part 40 receives the target operation reaction force signal Tms, and outputs a control signal Mcs for controlling driving of the operation reaction force motor 19. Based upon the control signal Mcs, the operation reaction force motor driving circuit 41 outputs a driving signal Ms for driving the operation reaction force motor 19 to the operation reaction force motor 19.

(Description in Operation)

Next, an operation of the vehicle having a driving operation unit according to the first embodiment of the present invention will be described with reference to the drawings.

First, in cases where a driver performs a steering operation to move the lever 11 from the neutral position to the right, the operation amount of the lever 11, in early stages, is still small but the torque applied to the lever 11 becomes great. A detected torque value Ts (positive output value) is outputted from the operation torque sensor 15, and thus the FF control part 38 of the steering control section 31 determines a control signal Fcs transmitted to the steering motor control signal outputting part 36 by looking up a torque map using the detected torque value Ts from the operation torque sensor 15 as an address or search key. Then, based upon the control signal Fcs, the rack shaft 7 moves linearly, whereby the rack shaft 7 starts moving to the right before starting a substantial operation of the lever 11.

Based upon the operation amount (detected value θs) of the lever 11, the control unit 4 determines a target steering angle signal θm, and calculates a deviation amount (deviation amount signal Drs) of a current value of the actual steering angle signal θr from the target steering angle signal θm. Based upon the deviation amount signal Drs, the steering motor control signal outputting part 36 and the steering motor driving circuit 37 are operated to drive the steering motor 5, so as to move the rack shaft 7 at a predetermined distance to the right. As a result, the steerable wheels W, W are steered. On the other hand, the operation reaction force control section 32 of the control unit 4 determines an operation reaction force to be exerted on the lever 11 in accordance with the deviation amount signal Drs, and drives the operation reaction force motor 19 to generate the operation reaction force to be exerted on the lever 11 to the left in accordance with a target operation reaction force signal Tms determined based upon a virtual torsion bar control. This reaction force, as well as a reaction force given by the centering mechanism 20 in proportion to the operation angle of the lever 11, is exerted on the lever to the left.

In this condition, when the lever 11 is operated toward the right, the left operation reaction force increases and the actual steering angle further increases to the right. On the other hand, when the lever 11 is operated toward the left, the actual steering angle decreases, and the lever 11 undergoes an assisting force from the centering mechanism 20 toward the left. The operation reaction force control section 32 of the control unit 4 determines a driving signal Ms in accordance with a target operation reaction force Tms as a reaction force of the virtual torsion bar control. In response to the driving signal Ms, the operation reaction force motor 19 is driven, and an operation reaction force is exerted on the lever 11 toward the right.

With reference to FIGS. 6, 7, 12, 13 and other drawings, a description will be given of a "steering amount reduction control" by which an actual steering angle of the steerable wheels W, W is reduced toward a neutral position if tires stand in a non-linear region of tire characteristic.

Figure 12:
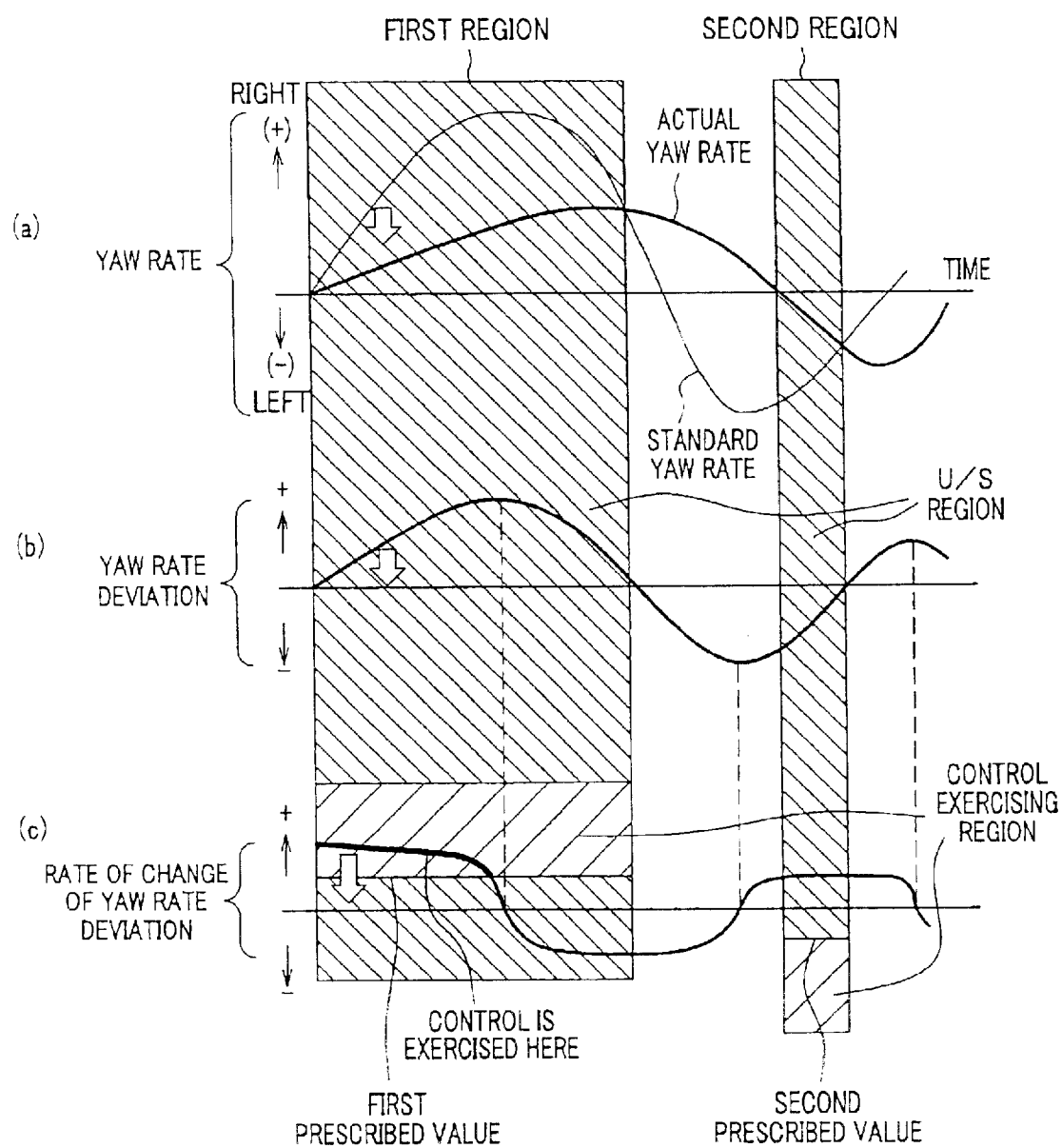
FIG. 12 is a timing chart for showing (a) yaw rates, (b) a yaw rate deviation, and (c) a rate of change of the yaw rate deviation, each changing with steering operation of a driver with a vehicular driving operation apparatus according to a first embodiment of the present invention.

FIG. 12 is a timing chart for showing (a) yaw rates, (b) a yaw rate deviation, and (c) a rate of change of the yaw rate deviation, each changing with the steering operation of a driver. Specifically, FIG. 12(*a*) represents a standard yaw rate and an actual yaw rate. FIG. 12(*b*) represents a deviation of the both yaw rates (Yaw rate deviation=Standard yaw rate−Actual yaw rate). FIG. 12(*c*) represents a rate of change of the yaw rate deviation, which can be expressed as (Current value of yaw rate deviation−Previous value thereof)/Predetermined time interval. In FIG. 12, densely hatched areas with oblique lines downwardly extending from left to right are understeer regions (U/S regions). The understeer regions may be divided into two: "first region" in which the sign of the yaw rate deviation is positive (+) and the sign of the actual yaw rate is positive (+); and "second region" in which the sign of the yaw rate deviation is negative (−) and the sign of the actual yaw rate is negative (−). In FIG. 12(*c*), sparsely hatched areas with oblique lines upwardly extending from left to right are control exercising regions in which the steering amount reduction control is exercised.

As shown in FIG. 12(*a*), when the standard yaw rate is at the positive (+) side, the steerable wheels W, W are located at the right side with respect to the neutral position (the actual steering angle is at the right side). When the actual yaw rate is at the positive (+) side, the vehicle behavior (as indicating a traveling direction of the vehicle) is oriented toward the right. In contrast, when the signs of the standard yaw rate and the actual yaw rate are at the negative (−) side, the reverse is true with the steerable wheels W, W and the vehicle behavior.

In FIG. 12, the driver, first, performs a right steering operation, and then performs a left steering operation. The right steering operation will now be described.

When the driver operates the lever 11 and performs the right steering operation, the standard yaw rate increases in accordance with the actual steering angle. However, in cases where the vehicle is likely to undergo understeer, such as slippery road conditions, slippery tire conditions, slippery vehicle configurations, and the like, even if the driver operates the lever 11 to steer the vehicle, the actual yaw rate would not proportionately become great with the standard yaw rate, whereby understeer would occur. In this instance, the signs of the rate of change of the yaw rate deviation and the actual yaw rate are both positive (+).

When the yaw rate deviation increases, the rate of change of the yaw rate deviation becomes great, and as indicated by in the first region of FIG. 12(*c*), the rate of change of the yaw rate deviation exceeds the first prescribed value (threshold or upper limit at the positive side), and gets into the control exercising region. In other words, it is determined that the tires stand in the linear region of tire characteristic. In this condition, even if the driver further performed the right steering operation, the understeer condition would be getting worse.

Therefore, in the present embodiment, in the control exercising region as indicated in FIG. 12(*c*), the non-linear region controller 45 produces a steering amount reduction signal θb, and the steerable wheels W, W are steered to the left in accordance with this signal θb (with the result that the deviation amount signal Drs exhibits a negative (−) value). Otherwise, the steerable wheels W, W are prevented from being steered to the right. To be more specific, in order to prevent further understeer that would occur when the tires stand in the non-linear region of tire characteristic, the steering amount reduction control is performed in which the steerable wheels W, W are moved back to the neutral position, or the steerable wheels W, W are prevented from being further steered to the right, independently of the driver's intention.

As a result of the steering amount reduction control, the standard yaw rate becomes small, as indicated by an outlined arrow, and the yaw rate deviation and the rate of change of the yaw rate deviation also become small accordingly. Because the tires come from the non-linear region to the linear region of tire characteristic, the vehicle is oriented in such a direction as to get rid of the understeer condition, and the grip of the tires is restored.

Next, the left steering operation will be described with reference to FIG. 12.

In FIG. 12, the second region is an understeer region. However, as indicated by a line of the standard yaw rate in FIG. 12(*a*), the driver performs an operation to move the lever 11 back toward the neutral position, and thus the yaw rate deviation changes toward zero. In other words, the understeer is abating. Therefore, the signs of the rate of change of the yaw rate deviation and the actual yaw rate are: the former is positive (+) and the latter is negative (−). In other words, the signs are different from each other. Moreover, the rate of change of the yaw rate deviation would never become less than the second prescribed value (threshold or lower limit at the negative side) in the second region. Consequently, the steering amount reduction control is not exercised.

However, though not shown, if the driver performs the left steering operation in the second region to a large extent (i.e., pulls the lever 11 extensively down to the left), then the yaw rate deviation swiftly increases to the negative (−) side (increasing the understeer condition), and the rate of change of the yaw rate deviation immediately goes to the negative (−) side. Therefore, the signs of the rate of change of the yaw rate deviation and the actual yaw rate both become negative. Further, depending upon the extent of the left steering operation, the rate of change of the yaw rate deviation becomes less than the second prescribed value (threshold at the negative side). In this instance, the rate of change of the yaw rate deviation resultantly gets into the control exercising region, and thus the steering amount reduction control is performed.

Figure 13:
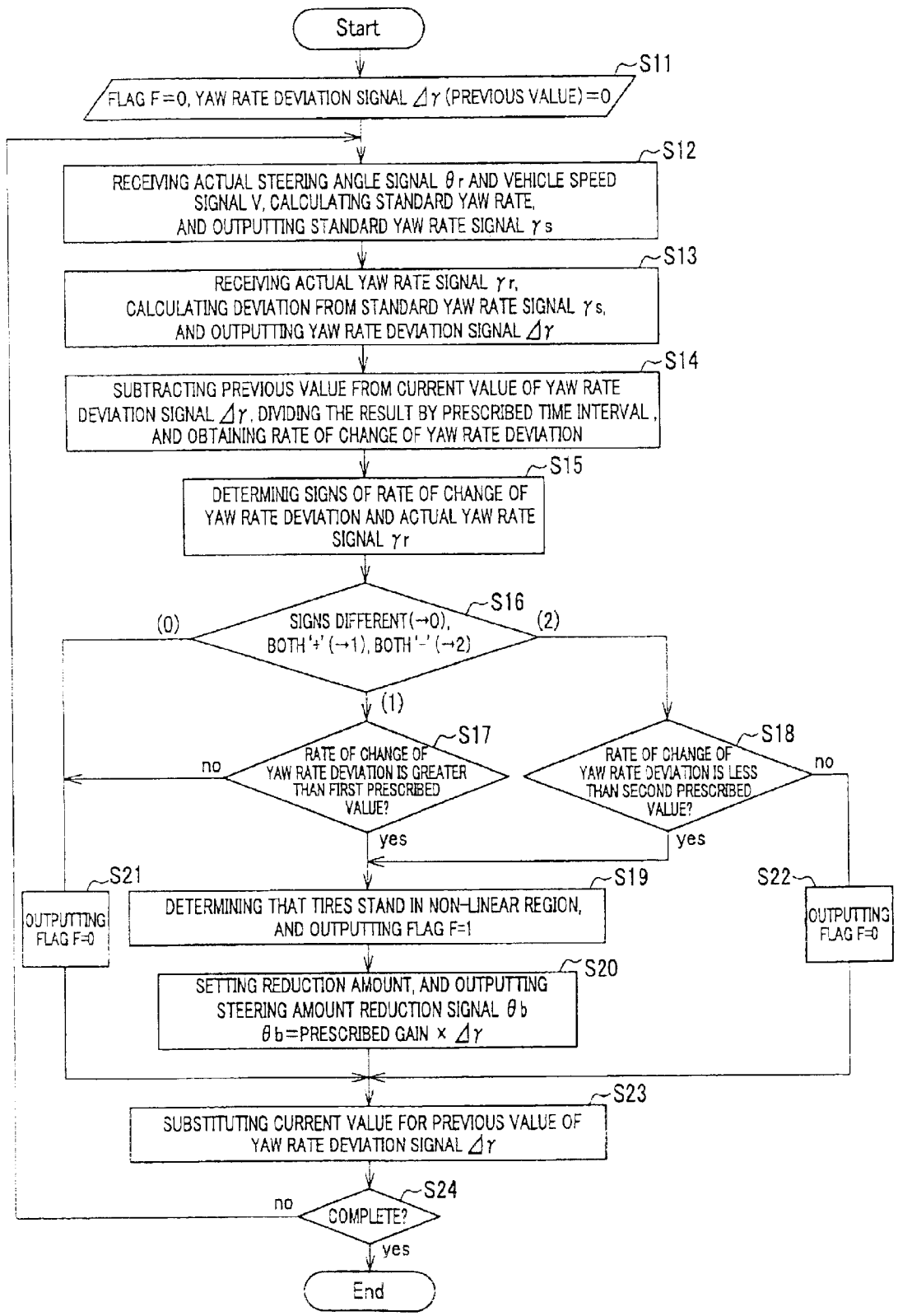
FIG. 13 is a flowchart of a process for controlling reduction of a steering amount of the vehicular driving operation apparatus according to the first embodiment of the present invention, which process is performed in the non-linear region controller.

Referring next to FIG. 13, a control flow chart, a description will be given of an exemplary operation of the non-linear region controller 45 that exercises a steering amount reduction control, with reference to be made to FIGS. 1–7 as necessary. FIG. 13 shows a flowchart of a process for controlling reduction of the steering amount in the non-linear region controller 45. The process may be implemented in the form of a computer program and executed by a "program for determining linearity of tire characteristic" according to the present invention.

First, in the non-linear region controller 45 of the steering control section 31 of the control unit 4, the following process is executed. In step S11, an initial value of the flag F for instructing the setting of the steering amount reduction signal θb is set at zero, and an initial value of the yaw rate deviation signal Δγ is set at zero. In step S12, an actual steering angle signal θr transmitted from the steering angle sensor 10 and a vehicle speed signal V transmitted from the speed sensor 22 are inputted to calculate a standard yaw rate, and the standard yaw rate is outputted in the form of a standard yaw rate signal γs to a subsequent step. In step 13, an actual yaw rate signal γr transmitted from the yaw rate sensor 23 is inputted to calculate a deviation of the actual yaw rate signal γr from the standard yaw rate signal γs, and the deviation is outputted in the form of a yaw rate deviation signal Δγ. In step S14, the previous value of the yaw rate deviation signal Δγ is subtracted from the current value thereof, and the result is divided by a prescribed time interval to calculate a rate of change of the yaw rate deviation.

Next, in steps S15 and S16, the signs of the rate of change of the yaw rate deviation and the actual yaw rate signal γr are determined, and if it is determined that the signs are different (0), then the process goes to step S21. If it is determined that the signs are both positive (1), then it is determined in step S17 whether or not the rate of change of the yaw rate deviation is greater than a first prescribed value. If it is determined in step S17 that the rate of change of the yaw rate deviation is not greater than the first prescribed value (no), then the process goes to step S21. Conversely, if it is determined in step S17 that the rate of change of the yaw rate deviation is greater than the first prescribed value (yes), then the process goes to step S19. If it is determined in step S16 that the signs are both negative (2), then it is determined in step S18 whether or not the rate of change of yaw rate deviation is less than a second prescribed value. If it is determined in step S18 that the rate of change of the yaw rate deviation is not less than a second prescribed value (no), then the process goes to step S22. Conversely, if it is determined in step S18 that the rate of change of the yaw rate deviation is less than a second prescribed value (yes), then the process goes to step S19.

In step S19, it is determined that the tires stand in the non-linear region, and the flag F is set at '1' (one), and the flag F='1' is outputted to a subsequent step to be performed in the reducing steering amount setting part 454. In step S20, the reducing steering amount setting part 454 multiplies a prescribed gain by the yaw rate deviation signal Δγ to set a reducing steering amount, and outputs the resultant reducing steering amount in the form of a steering amount reduction signal θb to the deviation arithmetic part 35 located downstream thereof. In a manner as described above, the steering amount reduction control is exercised.

In steps S21 and S22, the flag F=0 is outputted. In step S23, the current value of the yaw rate deviation signal Δγ is substituted for the previous value thereof, and thereby the next process is prepared. In step S24, it is determined whether or not the process is complete, and if the process is not complete, then the process goes back to step S12.

As described above, the standard yaw rate and the actual yaw rate are used for determination in the present embodiment, and thus the condition of tires in view of linearity of tire characteristic can be determined without using expensive or complex sensors, and without the help of complicated tire models. Moreover, in the present embodiment, not only the signs of the rate of change of the yaw rate deviation and the actual yaw rate are evaluated, but also the rate of change of the yaw rate deviation is compared with the first or second prescribed value (threshold), and thus non-linearity of tire characteristic can be determined accurately. Further, based upon the determination result, the steering amount reduction control, i.e., control for eliminating the understeer condition, (i.e., control by making the most use of linearity of tire characteristic) can be exercised accurately.

As the steering amount reduction control makes the actual steering angle small, the standard yaw rate, and the yaw rate deviation as well, becomes small accordingly. In other words, the active steering control implemented as the steering amount reduction control produces a small amount (θb) of control. Therefore, the steering amount reduction control, if exercised independently of the driver's intention, would not fret the driver so much. Since the reducing steering amount (as indicated by θb) is also based upon the yaw rate deviation, the steering amount reduction control would not produce so much fret of the driver, or rather would never fret the driver.

If the signs of the rate of change of the yaw rate deviation and the actual yaw rate are different from each other, or if the signs of the rate of change of the yaw rate deviation and the actual yaw rate are identical to each other but the rate of change of the yaw rate deviation falls within a range between the first and second prescribed values inclusive, it may be determined that the tires stand in the linear region of tire characteristic, as is the case where the vehicle is on a slippery road.

On the other hand, in cases where the actual steering angle is great for some reason, the tire model used for the standard yaw rate does not have non-linear characteristic, and thus the standard yaw rate becomes very great in accordance with the great actual yaw rate. In contrast, the actual vehicle behavior demonstrates that the measured yaw rate becomes stagnant (i.e., ceases to increase) or increases but with relatively small amount (increase). Accordingly, the rate of change of the yaw rate deviation would become larger than that in cases where the tires stand in a linear region of tire characteristic.

In the present embodiment of the driving operation apparatus, with consideration given to the above characteristic, the rate of change of the yaw rate deviation and the sign of the actual yaw rate are observed, so that active control implemented as the steering amount reduction control may be exercised based upon the result of observation to reduce the actual steering angle toward zero (to move the lever 11 back toward a neutral position thereof) or to prevent the actual steering angle from being further increased, thereby allowing the driver to steer the vehicle adequately even when the tires stand in the linear region of tire characteristic. The same applies to the second embodiment, as well. Consequently, the driver can actively operate the vehicle even when the tires stand in the linear region of tire characteristic. While doing so, the driver would not be fretted so much as described above.

[Second Embodiment]

Next, a second embodiment of a driving operation apparatus according to the present invention will be described with reference to FIG. 14 and other drawings as necessary. Arrangements and components similar to those described in the first embodiment will be designated by the same reference numerals as in the first embodiment, and a reference will be made to the drawings for the first embodiment, though a detailed explanation of such arrangements and components will not be given.

The active control in the first embodiment is implemented as the steering amount reduction control exercised in the steering controlling section 31 for control the driving of the steering motor 5. In contrast, as shown in FIG. 14, the second embodiment is configured to exercise such steering amount reduction control in an operation reaction force control section 32 that drives an operation reaction force motor 19.

A non-linear region controller 45A, like the non-linear region controller 45 in the first embodiment as shown in FIG. 7, receives an actual steering angle signal θr, a vehicle speed signal V and an actual yaw rate signal γr. Then, the non-linear region controller 45A executes the same process steps as in the process flow of FIG. 13, in which if it is determined that the tires stand in a non-linear region of tire characteristic, a yaw rate deviation signal Δγ is outputted to a target operation reaction force setting part 39.

Figure 14:
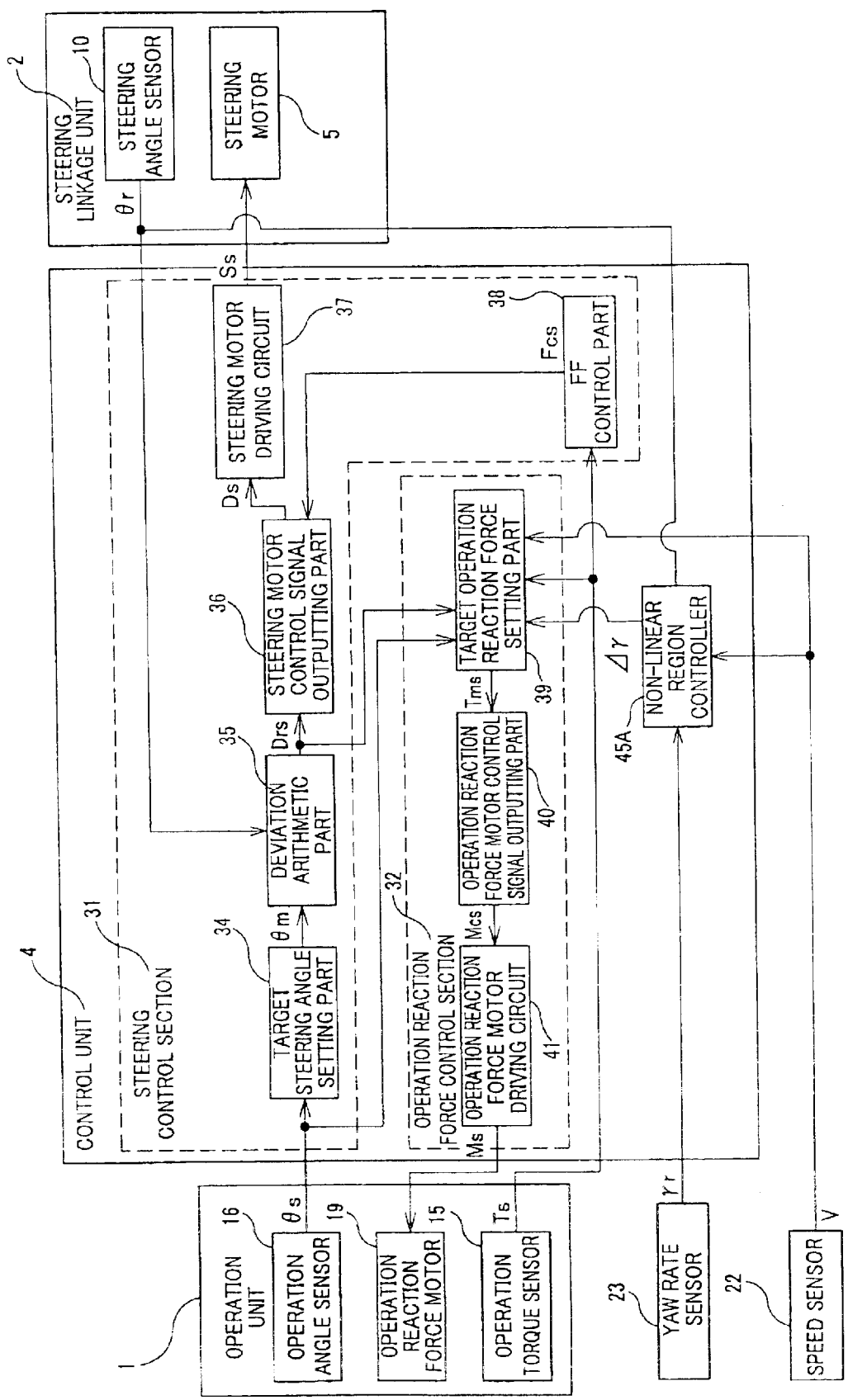
FIG. 14 is a functional block diagram of a control unit in the vehicular driving operation apparatus in a second exemplified embodiment of the present invention.

In the target operation reaction force setting part 39 shown in FIG. 14, like the first embodiment, a deviation amount signal Drs is multiplied by the coefficients K2 (see FIG. 8), K3 (see FIG. 9), K4 (see FIG. 10) and K5 (see FIG. 11), respectively. In the present embodiment, the resultant value is further multiplied by a coefficient Kγ based upon the yaw rate deviation amount signal Δγ (Kγ=f(Δγ)). The coefficient Kγ based upon the yaw rate deviation amount signal Δγ is configured to generate a larger operation reaction force to move the lever 11 from the right back toward a neutral position as the yaw rate deviation becomes greater toward a positive side, while on the contrary the coefficient Kγ is configured to generate a larger operation reaction force to move the lever 11 from the left back toward the neutral position as the yaw rate deviation becomes greater toward a negative side. It is understood that the operation reaction force may allow the lever 11 to actually move toward the neutral position, or may serve to prevent/reduce the movement of lever 11 away from the neutral position.

According to the steering amount reduction control utilizing the operation reaction force motor 19 as in the second embodiment, the reaction force increased in accordance with the steering amount reduction control is based upon the yaw rate deviation as in the first embodiment, and thus the driver would not be fretted so much, or would not be fretted at all. Moreover, determination of the condition of tires in view of non-linearity of tire characteristic is made in a manner as in the first embodiment, the advantages derived from the manner in which the determination of the condition of tires in view of non-linearity of tire characteristic is made is also obtained in the second embodiment, as well. Further, in the second embodiment, like the first embodiment, as the steering amount reduction control makes the standard yaw rate small, the amount of control (Δγ) also becomes small. In other words, as in the first embodiment, the amount of control by means of active steering control exercised independently of the driver's intention automatically becomes small, and therefore, the driver would not be fretted so much.

Although the preferred embodiments of the present invention have been described above, the present invention is not limited to the above described embodiments, and various modifications and changes may be made in the present invention without departing from the spirit and scope thereof.

For example, the first embodiment and the second embodiment may be combined to form a practical embodiment. Although determination of signs are made with respect to the rate of change of the yaw rate deviation and the actual yaw rate in the above embodiments, such determination of signs may be made with respect to the yaw rate deviation and the actual yaw rate. In this instance, it is in the first region in the understeer (U/S) region of FIG. 12 that the signs of the yaw rate deviation and the actual yaw rate are both positive. On the other hand, it is in the second region in the U/S region of FIG. 12 that the signs of the yaw rate deviation and the actual yaw rate are both negative. According to this method of determination of signs with respect to the yaw rate deviation and the actual yaw rate, the understeer region can accurately be determined.

In the above-described embodiments, the condition of tires is determined in view of non-linearity of tire characteristic, but it may be determined in view of linearity of tire characteristic, instead. The both of non-linearity and linearity may be determined with respect to the condition of the tires. It is understood that the linearity and non-linearity or a linear region and non-linear region of tire characteristic are like two sides of the same coin. Therefore, if the condition of tires is determined in view of linearity of tire characteristic, then the condition of the tires in view of non-linearity of tire characteristic is determined automatically, on the premise that no transition region or gray (intermediate) region is observed. On the contrary, if the condition of tires is determined in view of non-linearity of tire characteristic, then the condition of the tires in view of linearity of tire characteristic is determined automatically.

The standard yaw rate is calculated based upon the actual steering angle (rack position), but may also be calculated based upon an operation angle of the lever or upon a target steering angle.

The operation reaction force is generated based upon a deviation of the actual steering angle from the target steering angle, but may also be generated based upon an operation angle of the lever.

Further, the steer-by-wire vehicle is taken for example in the above embodiments, but the apparatus and program for determining linearity of tire characteristic, and the vehicular driving operation apparatus according to the present invention may also be applied to ordinary vehicles without the steer-by-wire system or vehicles equipped with an electric power steering system. For example, an ordinary vehicle may have a mechanism in which an alarm (e.g., voice, sound, light, vibration, etc.) is generated when it is determined that the tires stand in a non-linear region of tire characteristic. In this instance, the alarm may be configured to change in magnitude according to the yaw rate deviation or the rate of change of the yaw rate deviation. Needless to say, thus-configured alarm may be employed in a steer-by-wire vehicle, too. Moreover, an assist motor in an electric power steering system may be driven in such a manner as the steering motor in the above embodiments, whereby steering amount reduction control can be exercised. For vehicles having a brake actuator that can generate a braking force for each wheel independent of the driver's intention, the braking force may be generated based upon determination of linearity of tire characteristic so that understeer condition may be eliminated. In this instance, the braking force may preferably be configured to change in accordance with the yaw rate deviation or the rate of change of the yaw rate deviation so as not to fret the driver so much. In short, when determination of linearity of tire characteristic is made to control a device (e.g., steering motor, operation reaction force motor, alarm, etc.) to lead the device to a condition where understeer is eliminated and tires are within the linear region of tire characteristic, the amount of control may preferably be configured to change in accordance with the yaw rate deviation or the rate of change of the yaw rate deviation.

To illustrate the operation unit with which the driver performs an operation, a lever (joystick) is taken for example in the above embodiments, but an ordinary type of steering wheel may be used instead. Further, such a lever is used only for the steering operation in the above embodiments, but a throttling operation or braking operation may be performed via the same lever. The control unit can be implemented in the form of software or hardware.

With the apparatus for determining linearity of tire characteristic according to the present invention, advantageously, an adequate determination can be made whether the condition of tires is in a linear region of tire characteristic or not, with comparative ease, using an ordinary sensor available at low cost. With the program for determining linearity of tire characteristic according to the present invention, an adequate determination can be made whether the condition of tires is in a linear region of tire characteristic or not, utilizing a computer.

With the vehicular driving operation apparatus according to the present invention, various advantages can be achieved, for example, a steering motor/operation reaction motor is driven so that a driver can comfortably drive a vehicle including a steer-by-wire vehicle by making the most use of linearity of tire characteristic.

What is claimed is:

1. An apparatus for determining linearity of tire characteristic comprising:

a standard vehicle behavior arithmetic unit that calculates a standard vehicle behavior indicator based upon at least one of an operation amount of an operation unit with which a driver of a traveling vehicle performs a steering operation and an actually steered amount of steerable wheels of the traveling vehicle, wherein the operation amount of the operation unit is detected by an operation amount detector and the actually steered amount of the steerable wheels is detected by a steered amount detector; and a tire characteristic linearity determination unit that compares an actual vehicle behavior indicator detected by a vehicle behavior detector with the standard vehicle behavior indicator, to determine whether tires of the traveling vehicle stand in a linear region or in a non-linear region of the tire characteristic.

2. An apparatus for determining linearity of tire characteristic according to claim 1, wherein the tire characteristic linearity determination unit includes:

a vehicle behavior deviation change rate arithmetic part that calculates a vehicle behavior deviation by subtracting the actual vehicle behavior indicator from the standard vehicle behavior indicator, and calculates a rate of change of the vehicle behavior deviation;

a sign determination part that determines a first sign of one of the vehicle behavior deviation and the rate of change of the vehicle behavior deviation, and a second sign of the actual vehicle behavior indicator;

a tire characteristic linearity determination part that determines linearity of tire characteristic, wherein if the first and second signs are both positive and the rate of change of the vehicle behavior deviation is greater than a first prescribed value, and if the first and second signs are both negative and the rate of change of the vehicle behavior deviation is less than a second prescribed value, it is determined that the tires of the traveling vehicle stand in the non-linear region of the tire characteristic.

3. A program embodied on a computer readable medium for determining linearity of tire characteristic, which causes a computer to execute a process to determine whether tires of a traveling vehicle stand in a linear region or in a non-linear region of the tire characteristic, the process comprising the steps of:

receiving at least one of an operation amount of an operation unit with which a driver of the traveling vehicle performs a steering operation and an actually steered amount of steerable wheels of the traveling vehicle, which are detected by an operation amount detector and a steered amount detector, respectively;

calculating a standard vehicle behavior indicator based upon the at least one of the operation amount of the operation unit and the actually steered amount of the steerable wheels;

receiving an actual vehicle behavior indicator detected by a vehicle behavior detector;

calculating a vehicle behavior deviation by subtracting the actual vehicle behavior indicator from the standard vehicle behavior indicator;

calculating a rate of change of the vehicle behavior deviation;

determining a first sign of one of the vehicle behavior deviation and the rate of change of the vehicle behavior deviation, and a second sign of the actual vehicle behavior indicator;

if the first and second signs are both positive and the rate of change of the vehicle behavior deviation is greater than a first prescribed value, determining that the tires of the traveling vehicle stand in the non-linear region of the tire characteristic; and if the first and second signs are both negative and the rate of change of the vehicle behavior deviation is less than a second prescribed value, determining that the tires of the traveling vehicle stand in the non-linear region of the tire characteristic.

4. A vehicular driving operation apparatus comprising:

an operation unit with which a driver of a traveling vehicle performs a steering operation;

a steering amount detection unit including at least one of an operation amount detector that detects an operation amount of the operation unit and a steered amount detector that detects an actually steered amount of steerable wheels of the traveling vehicle;

a steering motor that drives the steerable wheels to be steered;

a control unit that controls the steering motor based upon at least one of the operation amount of the operation unit and the actually steered amount of the steerable wheels;

a vehicle behavior detector that detects an actual vehicle behavior indicator;

an apparatus for determining linearity of tire characteristic comprising:

a standard vehicle behavior arithmetic unit that calculates a standard vehicle behavior indicator based upon at least one of an operation amount of an operation unit with which a driver of a traveling vehicle performs a steering operation and an actually steered amount of steerable wheels of the traveling vehicle, wherein the operation amount of the operation unit is detected by an operation amount detector and the actually steered amount of the steerable wheels is detected by a steered amount detector; and a tire characteristic linearity determination unit that compares an actual vehicle behavior indicator detected by a vehicle behavior detector with the standard vehicle behavior indicator, to determine whether tires of the traveling vehicle stand in a linear region or in a non-linear region of the tire characteristic; and a steering amount reduction control unit that controls the steering motor so that the steering motor drives the steerable wheels to be steered back if the tire characteristic linearity determination unit determines that the tires of the traveling vehicle stand in the non-linear region of the tire characteristic.

5. A vehicular driving operation apparatus comprising: an operation unit with which a driver of a traveling vehicle performs a steering operation;

a reaction force motor that gives a reaction force against operation of the operation unit;

a steering amount detection unit including at least one of an operation amount detector that detects an operation amount of the operation unit and a steered amount detector that detects an actually steered amount of steerable wheels of the traveling vehicle;

a steering motor that drives the steerable wheels to be steered;

a control unit that controls the steering motor based upon at least one of the operation amount of the operation unit and the actually steered amount of the steerable wheels;

a vehicle behavior detector that detects an actual vehicle behavior indicator;

an apparatus for determining linearity of tire characteristic comprising:

a standard vehicle behavior arithmetic unit that calculates a standard vehicle behavior indicator based upon at least one of an operation amount of an operation unit with which a driver of a traveling vehicle performs a steering operation and an actually steered amount of steerable wheels of the traveling vehicle, wherein the operation amount of the operation unit is detected by an operation amount detector and the actually steered amount of the steerable wheels is detected by a steered amount detector; and a tire characteristic linearity determination unit that compares an actual vehicle behavior indicator detected by a vehicle behavior detector with the standard vehicle behavior indicator, to determine whether tires of the traveling vehicle stand in a linear region or in anon-linear region of the tire characteristic; and a steering amount reduction control unit that controls the reaction force motor so that the reaction force motor drives the operation unit to move back toward a neutral position if the tire characteristic linearity determination unit determines that the tires of the traveling vehicle stand in the non-linear region of the tire characteristic.

6. A steering control method for a steer-by-wire vehicle having a steer-by-wire system which includes an operation unit with which a driver performs a steering operation, a steering motor that drives steerable wheels to be steered, and a reaction force motor that gives a reaction force against operation of the operation unit, to perform a steering operation through electric connections, the method comprising:

calculating a standard vehicle behavior indicator based upon at least one of an operation amount of the operation unit and an actually steered amount of the steerable wheels;

comparing an actual vehicle behavior indicator obtained by detection with the standard vehicle behavior indicator, to determine whether tires of the vehicle during traveling stand in a linear region or in a non-linear region of tire characteristic; and if it is determined that the tires of the traveling vehicle stand in the non-linear region of the tire characteristic, controlling at least one of the reaction force motor and the steering motor to steer the steerable wheels toward such a direction as to reduce the steering amount thereof.

* * * * *